(12) United States Patent
Seiler et al.

(10) Patent No.: US 11,308,681 B1
(45) Date of Patent: Apr. 19, 2022

(54) DISPLAY ENGINE FOR POST-RENDERING PROCESSING

(71) Applicant: Facebook Technologies, LLC, Menlo Park, CA (US)

(72) Inventors: Larry Seiler, Redmond, WA (US); Alexander Nankervis, Seattle, WA (US); John Adrian Arthur Johnston, San Mateo, CA (US); Jeremy Freeman, Kirkland, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 16/586,614

(22) Filed: Sep. 27, 2019

Related U.S. Application Data

(60) Provisional application No. 62/755,333, filed on Nov. 2, 2018.

(51) Int. Cl.
| | | |
|---|---|---|
| *G06T 15/06* | (2011.01) | |
| *G06T 15/02* | (2011.01) | |
| *G06T 15/10* | (2011.01) | |
| *G06T 19/00* | (2011.01) | |

(52) U.S. Cl.
CPC .............. *G06T 15/06* (2013.01); *G06T 15/02* (2013.01); *G06T 15/10* (2013.01); *G06T 19/006* (2013.01)

(58) Field of Classification Search
CPC . G06F 3/01; G06F 3/011; G06F 3/013; G06T 15/02; G06T 15/04; G06T 15/06; G06T 15/10; G06T 15/20; G06T 15/205; G06T 15/40; G06T 19/006
See application file for complete search history.

(56) References Cited

U.S. PATENT DOCUMENTS

| | | | | |
|---|---|---|---|---|
| 8,446,433 | B1 * | 5/2013 | Mallet | G06T 5/006 345/647 |
| 9,142,043 | B1 * | 9/2015 | Aila | G06T 11/40 |
| 2010/0090929 | A1 | 4/2010 | Tsujimoto | |
| 2012/0194517 | A1 | 8/2012 | Izadi et al. | |
| 2014/0035904 | A1 * | 2/2014 | Ge | G06T 15/00 345/419 |

(Continued)

OTHER PUBLICATIONS

Sanna A, Montuschi P. An efficient algorithm for ray casting of CSG animation frames. The Journal of Visualization and Computer Animation. Oct. 1998;9(4):229-42 (Year: 1998).*

(Continued)

*Primary Examiner* — Diane M Wills
(74) *Attorney, Agent, or Firm* — Baker Botts L.L.P.

(57) ABSTRACT

In one embodiment, a method includes, generating rays for casting into an artificial reality scene that includes one or more surfaces to determine whether the one or more surfaces are visible from a viewpoint. An origin and a trajectory of each ray are based on the viewpoint. The method includes applying a geometric transformation to the rays to modify their respective trajectory into the artificial reality scene. The geometric transformation is based on one or more distortion characteristics of a display system. The method includes determining, based on the modified trajectories of the rays, points of intersection of rays with the one or more surfaces in the artificial reality scene. The method includes providing, for display by the display system, color values generated based on the determined points of intersection.

20 Claims, 12 Drawing Sheets

(56) References Cited

U.S. PATENT DOCUMENTS

| | | | |
|---|---|---|---|
| 2014/0063016 A1 | 3/2014 | Howson et al. | |
| 2014/0132484 A1* | 5/2014 | Pandey | G06T 19/006 345/8 |
| 2015/0029218 A1* | 1/2015 | Williams | G06T 19/006 345/633 |
| 2015/0310665 A1* | 10/2015 | Michail | G02B 27/0179 345/419 |
| 2015/0379697 A1* | 12/2015 | Pohl | G02B 27/0172 345/589 |
| 2017/0018121 A1 | 1/2017 | Lawson et al. | |
| 2017/0115488 A1 | 4/2017 | Ambrus et al. | |
| 2017/0155885 A1 | 6/2017 | Selstad et al. | |
| 2017/0169602 A1 | 6/2017 | Blackmon et al. | |
| 2017/0374341 A1 | 12/2017 | Michail et al. | |
| 2018/0005432 A1* | 1/2018 | Breiner | G06T 15/60 |
| 2018/0053284 A1* | 2/2018 | Rodriguez | G06F 3/14 |
| 2018/0081429 A1 | 3/2018 | Akenine-Moller et al. | |
| 2018/0253868 A1 | 9/2018 | Bratt et al. | |
| 2018/0255278 A1* | 9/2018 | Tardif | G06F 3/011 |
| 2018/0322669 A1* | 11/2018 | Elliott | G06T 15/503 |
| 2018/0357749 A1 | 12/2018 | Young et al. | |
| 2019/0102865 A1* | 4/2019 | Hensley | G06F 30/30 |
| 2019/0172178 A1* | 6/2019 | Yeung | H04M 1/72544 |

OTHER PUBLICATIONS

International Search Report and Written Opinion for International Application No. PCT/US2019/058724, dated Jan. 21, 2020.
Adelson, et al., Generating Exact Ray-Traced Animation Frames by Reprojection, IEEE Computer Graphics and Applications, IEEE Service Center, pp. 43-52, May 1, 1995.
Baboud L., et al., "Rendering Geometry with Relief Textures," Graphics Interface 2006: Proceedings of Graphics Interface, Jun. 2006, pp. 195-201.
Bartczak B., et al., "Display-Independent 3D-TV Production and Delivery Using the Layered Depth Video Format," IEEE Transactions on Broadcasting, Jun. 2011, vol. 57 (2), pp. 477-490.
Boulos S., et al., "Packet-based Whitted and Distribution Ray Tracing," ACM, Graphics Interface 2007, Proceedings of Graphics Interface 2007, May 28-30, 2007, pp. 177-184.
Cohen D., et al., "Photo-Realistic Imaging of Digital Terrains," Eurographics'93, Computer Graphics Forum, Aug. 1993, vol. 12 (3), pp. 363-373.
Cook R.L., et al., "Distributed Ray Tracing," ACM, Computer Graphics, Jul. 1984, vol. 18 (3), pp. 137-145.
Ghileiiuc J., et al., "Real-time Remote Rendering of Large 3D Models on Smartphones using Multi-layered Impostors," ACM, Mirage '13: Proceedings of the 6th International Conference on Computer Vision/ Computer Graphics Collaboration Techniques and Applications, Jun. 6-7, 2013, 8 Pages.
Pasman W., et al., "Distributed Low-latency Rendering for Mobile AR," IEEE, Proceedings IEEE and ACM International Symposium on Augmented Reality, 2001, 7 pages.
Pohl D., et al., "Improved Pre-Warping for Wide Angle, Head Mounted Displays," ACM, VRST '13: Proceedings of the 19th ACM Symposium on Virtual Reality Software and Technology, Oct. 6-9, 2013, pp. 259-262.
Reinert B. et al., "Proxy-guided Image-based Rendering for Mobile Devices," Pacific Graphics, 2016, vol. 35, No. 7, pp. 353-362.
Shade J., et al., "Layered Depth Images," ACM, SIGGRAPH '98: Proceedings of the 25th Annual Conference on Computer graphics and Interactive Techniques, Jul. 1998, 12 pages.
Nidmer S., et al., "An Adaptive Acceleration Structure for Screen-space Ray Tracing," ACM, High Performance Graphics 2015, Aug. 7-9, 2015, pp. 67-76.

* cited by examiner

DISPLAY ENGINE FOR POST-RENDERING PROCESSING

PRIORITY

This application claims the benefit, under 35 U.S.C. § 119(e), of U.S. Provisional Patent Application No. 62/755,333, filed 2 Nov. 2018, which is incorporated herein by reference.

TECHNICAL FIELD

This disclosure generally relates to generating graphics for an artificial reality scene.

BACKGROUND

Artificial reality involves the display of computer-generated graphics to a user in an immersive manner. The goal is to cause the user to experience the computer-generated graphics as though they existed in the world before them. Rendering computer-generated graphics for artificial reality is a computationally-intensive task, often requiring expensive and specialized hardware. This is due at least in part to the requirement that the graphics displayed to the user must be very high quality. For a user to believe that the graphics represent, or are a part of, the world around them, the graphics must be believably high quality. The screen-door effect, where either the graphics or the display used to project the graphics allow the user to see lines between pixels can ruin any sense of immersion. Furthermore, graphics for artificial reality scenes are often interactive—when a user "moves" in the virtual space, the space moves with or in response to them. Latency between a user's movement, or movement command, and displaying the effects of that movement can cause great discomfort to the user, such as virtual-reality sickness. Because a user's movements are typically unpredictable, pre-rendering most components of an artificial reality scene is impractical.

SUMMARY OF PARTICULAR EMBODIMENTS

A system and method for generating an artificial reality scene for a user wearing a head-mounted display are described. The system may comprise numerous rendering components, such that rendering responsibilities are divided at least between a primary rendering component and a display engine of a head-mounted display. The primary rendering component may handle computation-heavy graphics rendering stages such as primitive interpretation and shading, with an expected output in the range of typical interactive graphics rendering. The primary rendering component may output one or more specialized object primitives (also referred to as "surfaces" herein), or output images that are made into such surfaces by the display engine, comprising location and texture data for one or more object primitives in the artificial reality scene. The display engine may receive the object primitives, update and refine their appearances to reflect changes in viewer perspective and/or accommodate display-device characteristics, finalize rendering and prepare the result for display to the user.

The display engine may comprise multiple stages, with multiple hardware blocks to handle specific steps in rendering an image to be display. The display engine may comprise a control block that receives the object primitives and any accompanying rendering instructions. The control block may prepare one or more shared memories to be used by the other blocks of the display engine. The control block may facilitate the loading of texture data into one or more memories. The control block may provide instructions to the other blocks of the display engine, including an instruction to initialize the graphics rendering pipeline.

The display engine may comprise a transform block that determines initial visibility for object primitives in the artificial reality scene. The transform block may perform raycasting from the viewpoint of the user looking into the artificial reality scene to re-sample the object primitives. The transform block may warp the rays used in the raycasting to approximate or correct one or more effects caused by a display. These effects may include one or more geometric distortions that result from a warping effect on one or more lenses used in the display. The transform block may determine whether any rays intersect an object primitive in the scene and convert location information for any ray-object-primitive intersections from a view coordinate space to the texture coordinate space of the object primitive.

The display engine may comprise a pixel block that efficiently determines a pixel color value for one or more pixels of the display. The pixel block may receive intersection information from the transform block (e.g., intersections between the cast rays and object primitives). The pixel block may reference texture data associated with the object primitive to perform bilinear interpolation for one or more of the pixel color values.

The display engine may comprise a display block that receives the pixel color values and finalizes the pixel color values for output to the display. The display block may convert the pixel color values into a format or alignment required by the display. The display block may apply one or more brightness correction effects. The brightness correction effects may include techniques to improve the quality of the image such as perception encoding or dithering. The brightness correction effects may address and correct irregularities in the display, caused by how the display and its components are manufactured, or how the images are displayed to a user.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
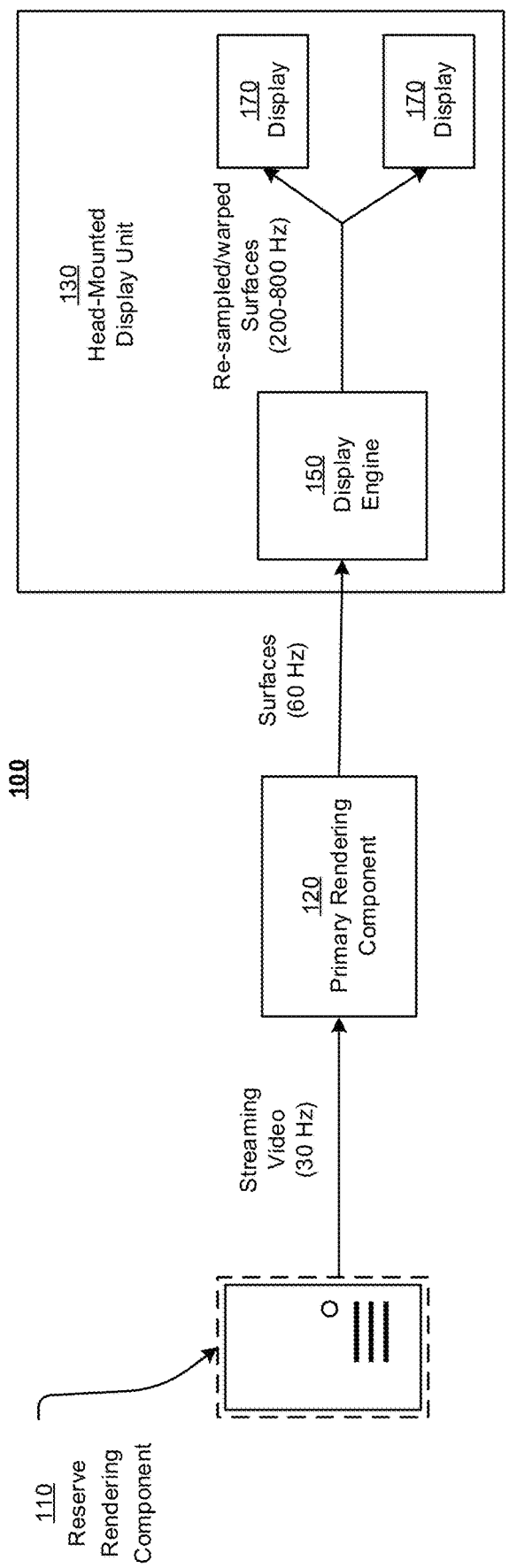
FIG. 1 illustrates an example high-level architecture for an artificial reality rendering and display system.

Because artificial reality devices involve creating digital scenes or superposing computer-generated imagery onto a view of the real world, they provide a platform for designers and engineers to provide new forms of information, entertainment, or methods of collaboration. For example, artificial reality devices may allow users to communicate, seemingly in person, over long distances, or assist users by informing them of the environment around them in an unobtrusive manner. Because artificial reality experiences can often be customized, the user's experience with artificial reality may be deeply personal and highly engaging if presented with sufficient clarity and convenience.

One way that artificial reality experiences can augment human ability is with computer-generated images and/or text added to the real world, as in an augmented or mixed reality. From this simple principle, a variety of compelling use cases can be considered. Labels (e.g., texts, glyphs, etc.) or images describing a real-world object may be fixed in the world space (e.g., location-aware labels acting as street signs or providing a live map of a bike path), or images fixed to a real-world object as it moves through the space (e.g., a label added to a bus as it going on its route that provides detailed information about its route or capacity). Labels could also be used to help a user navigate through an unfamiliar city (e.g., creating a waypoint for the nearest restroom), or help find a friend in a crowd (e.g., a socially-aware waypoint fixed to another user). Other experiences worth considering may be based on interactions with real-world objects. For example, a user could "project" video onto a wall or screen that allows for the video to be played and visible to only herself or to others with access to a shared augmented space. As another example, a user could fix computer-generated text to a physical object to act as an augmented-reality book or magazine. Content could be displayed relative to the object (allowing a user to physical asset aside an augmented-reality) or could be displayed in a fixed relation to the user's (e.g., a tutorial video constantly playing in a corner of the view). Presented media could be customized to the user, so that the same content display space could content relevant to each person viewing the same physical space. As another example, a user could interact with computer-generated graphics by "touching" an icon, or "manipulating" the computer-generated images manually. These graphics could be shown to multiple users working on a project, enabling opportunities for team collaboration (e.g., multiple architects working on a three-dimensional digital prototype in a building together in real-time).

To facilitate use, the display that outputs the computer-generated graphics should be intuitive, constantly accessible, and unobtrusive. One approach to displaying high definition artificial reality graphics to a user is a head-mounted display. The user wears an apparatus, such as a visor, headset, or glasses, capable of displaying computer graphics display. In augmented or mixed reality experiences, the computer graphics can be seen alongside, or on top of, the physical world. However, rendering these computer graphics is computationally intensive. Therefore, in most cases rendering is performed by powerful computers communicatively attached (e.g., via a cable or wireless communication protocol, such as Bluetooth) to a head-mounted display. In such a configuration, the head-mounted display is limited by bulky cords, bandwidth and power limitations, heat restrictions, and other related constraints. Yet, the limits of these constraints are being pushed. Head-mounted displays that are comfortable and efficient enough for day-long wearing, yet powerful enough to display sophisticated graphics are currently being developed.

One technique used to reduce actual display size without impacting apparent display size is known as a scanning display. In a scanning display, multiple smaller images are combined to form a larger composite image. The scanning display uses source light, one or more scanning elements comprising reflectors, and an optics system to generate and output image light. The output image light may be output to the eye of the user. The source light may be provided by emitters, such as light-emitting diodes (LEDs). For example, the light source may be an array of 2560×1440 LEDs. The reflectors may be any suitable reflective surface attached to the scanning element. In particular embodiments, the scanning element may be a scanning mirror driven using one or more microelectromechanical systems (MEMS) components. The optics system may comprise lenses used to focus, redirect, and otherwise augment the light. The scanning element may cause the source light, treated by light guiding components, to be output to the eye of the user in a specific pattern corresponding to a generation pattern used by the emitters to optimize display draw rate. Because, for example, all emitters need not be active at once, and in addition to a variety of other factors, scanning displays may require less power to run, and may generate less heat, than traditional display comprised of the same emitters. They may have less weight as well, owing in part to the quality of the materials used in the scanning element and optics system. One consequence of using a scanning display is that in exchange for, e.g., power, weight, and heat efficiency, a scanning displays may not perfectly display images as presented to them, e.g., images intended for traditional displays. There may be non-uniform distortions such as geometric warping of images and distortion of colors and specifically brightness. As is explained further herein, these distortions can be corrected by post-processing graphics to-be displayed to counteract the distortion before they are passed to the display, creating the effect that there is no distortion. Although this disclosure describes displays in a particular manner, this disclosure contemplates any suitable displays.

Since its existence, artificial reality (e.g., AR, VR, MR) technology has been plagued with the problem of latency in rendering AR/VR/MR objects in response to sudden changes in a user's perspective of an AR/VR/MR scene. To create an immersive environment, users may need to be able to move their heads around when viewing a scene and the environment may need to respond immediately by adjusting the view presented to the user. Each head movement may slightly change the user's perspective of the scene. These head movements may be small but sporadic and difficult (if not impossible) to predict. A problem to be solved is that the head movements may occur quickly, requiring that the view of the scene be modified rapidly to account for changes in perspective that occur with the head movements. If this is not done rapidly enough, the resulting latency may cause a user to experience a sensory dissonance that can lead to virtual reality sickness or discomfort, or at the very least, a disruption to the immersive nature of the experience. Re-rendering a view in its entirety to account for these changes in perspective may be resource intensive, and it may only be possible to do so at a relatively low frame rate (e.g., 60 Hz, or once every 1/60th of a second). As a result, it may not be feasible to modify the scene by re-rendering the entire scene to account for changes in perspective at a pace that is rapid enough (e.g., 200 Hz, once every 1/200th of a second) to prevent the user from perceiving latency and to thereby avoid or sufficiently reduce sensory dissonance. One solution involves generating and working with "surfaces," specially configured object primitives that represent a particular view of an object within the scene, where a surface corresponds to one or more objects that are expected to move/translate, skew, scale, distort, or otherwise change in appearance together, as one unit, as a result of a change in perspective. Instead of re-rendering the entire view, a computing system may simply resample these surfaces from the changed perspective to approximate how a corresponding object would look from the changed perspective. This method may essentially be an efficient shortcut, and may significantly reduce the processing that is required and thus ensure that the view is updated quickly enough to sufficiently reduce latency. Resampling surfaces, unlike re-rendering entire views, may be efficient enough that it can be used to modify views within the allotted time—e.g., in 1/200th of a second—with the relatively limited processing power of a computing system of a HMD. The time scales involved in this modification are so small that it may be unfeasible to have a more powerful system that is physically separated from the HMD (e.g., a separate laptop or wearable device) perform the modification, because the HMD would have to transmit information about the current position and orientation of the HMD, wait for the separate system to render the new view, and then receive the new view from the separate system. By simply resampling surfaces, the modification may be performed entirely on the HMD, thus speeding up the process.

FIG. 1 illustrates an artificial reality graphics rendering and display system 100. In particular embodiments, the rendering and display system 100 may comprise a reserve rendering component 110. The reserve rendering component 110 may be a remote rendering component used to perform supplemental rendering, or pre-render elements that can be prepared with less requirement of interactivity. For example, the reserve rendering component 110 may be a rendering server provided through a cloud computing network or local area network that handles pre-rendering of streaming video or other non-interactive components. The user may provide her own reserve rendering component 110 or may gain access to a reserve rendering component 110 as part of a subscription plan. The reserve rendering component may communicate wirelessly or through one or more wired connections to a primary rendering component 120. The primary rendering component 120 may be a standalone device such as a laptop or desktop computer, video game console, or any other suitable local graphics rendering system, or a device easily-worn on the user's body, such as a cellphone, tablet, or any other suitable compact graphics rendering system. The reserve rendering component 110 and/or primary rendering component 120 may perform several processes of a typical rendering pipeline. In particular embodiments, the primary rendering component 120 may be capable of rendering interactive graphics based on three-dimensional ("3D") models defined by a plurality of polygons and rendering instructions sufficient to support a frame refresh rate up to or surpassing 60 frames per second.

The primary rendering component 120 may receive primary rendering data for a rendering request. The primary rendering data may include two- or three-dimensional models, textures, and instructions for rendering computer-generated images, and other suitable information. The primary rendering component 120 may perform initial steps to render aspects of the artificial reality scene based on the received primary rendering data. For example, the primary rendering component 120 may perform visibility computations using ray tracing, rasterization, or other suitable techniques to determine which polygons of which 3D models of virtual objects in a virtual scene are visible through which pixels of a display. Based on the visibility determinations, the primary rendering component 120 may perform shading computations to determine the appropriate color for each pixel. In particular embodiments, the primary rendering component 120 may receive compressed or decompressed streaming video data from the reserve rendering component 110 at a rate of 30 frames per second, or similar. The primary rendering component 120 may combine data received from the reserve rendering component 110 with data generated by the initial rendering steps.

In particular embodiments, one or more specialized object primitives, e.g., "surfaces," for use by a display engine 150 may be generated. As an example, the primary rendering component 120 may generate surfaces by first rendering 2D images from 3D models, as in a typical rendering pipeline. The primary rendering component 120 may then generate surfaces from the 2D images using an additional post-processing method. As another example, the primary rendering component 120 may directly output surfaces from 3D models, eliminating extra steps directed only to rendering 2D images. As another example, the primary rendering component 120 may output 2D images from 3D models to a display engine 150. The display engine 150 may generate surfaces using an additional post-processing method based on the 2D images.

Surfaces may comprise information useful for rendering one or more virtual objects of an artificial reality scene. The information may include location and/or position data for the surface in the scene, specified in the coordinate system of the view space relative to the virtual camera/viewer (alternatively, location of the surface may also be specified in any other suitable coordinate system, such as the world space coordinate system). The surface may further include texture data, represented by one or more texel arrays. Thus, in particular embodiments, a "surface" may be considered as a rectangular texture with a transformation matrix to specify its location within a scene. Each texel in the texel array may have color information and a 2D coordinate within the texel array (e.g., specified in (u, v) coordinates). In particular embodiments, the color information of each texel may indicate the intensity of several color channels (e.g., red, green, and blue) and alpha information that indicates the texel's transparency level (e.g., completely transparent, completely opaque, or somewhere in between). In other embodiments, the color information of a texel may indicate the intensity of red, green, and blue without separately specifying the transparency level. In this case, the value for each color may be pre-multiplied by the texel's associated transparency level (e.g., if the texel is fully transparent with an alpha level of 0, then the red, green and blue values for that texel would all be zeroed-out by being multiplied by the 0 alpha level).

The texture data of a surface may be generated based on the result of a standard graphic rendering pipeline, embodying techniques to optimally determine the colors that should be displayed by the pixels of a display or image based on the perspective of a viewer in a three-dimensional scene. In particular embodiments, the display engine 150 may limit the number of surfaces (e.g., a maximum of 16 surfaces or any other suitable number of surfaces) that it will process to ensure sufficient simplicity in the scene so that performance demands can be met (e.g., to output frames at 200-300 hertz). Therefore, certain virtual objects in the artificial reality scene may be grouped according to any suitable rule. Each surface may be a representation of one or more objects within the scene that are expected to move/translate, skew, scale, distort, or otherwise change in appearance together, as one unit, as a result of a change in a user's perspective of the scene (e.g., resulting from a HMD on a user's head moving to a different position and/or orientation). As an example and not by way of limitation, an avatar of a person and a hat worn by the avatar may correspond to one surface if it is determined that person and the hat would move/translate, skew, scale, distort, or otherwise change in appearance together, as one unit. In particular embodiments, a surface may correspond to sets of points (e.g., points making up an object) that are expected to move/translate, skew, scale, distort, or otherwise change in appearance as a single unit when a user's perspective of a scene changes.

The primary rendering component 120 may communicate with a head-mounted display unit 130 through one or more wired or wireless connections. In particular embodiments, a user may be able to select how the primary rendering component 120 and head-mounted display unit 130 communicate based on the user's needs. The head-mounted display unit 130 may be configured to receive data, such as surfaces and other rendering instructions, from the primary rendering component 120. The head-mounted display unit 130 may prepare to display an artificial reality scene to a user based on the received data. In particular embodiments, the head-mounted display unit 130 may comprise a display engine 150 and one or more displays 170. In particular embodiments, the displays 170 may be scanning displays, including all necessary emitters, scanning elements, and optical systems. The head-mounted display unit 130 may further comprise additional components not shown that facilitate the rendering and display of the artificial scene. These may include additional image processing components, eye-tracking components, heat detection components, any other suitable components, or any combination thereof. Although this disclosure describes rendering components in a particular manner, this disclosure contemplates any suitable rendering components.

In particular embodiments, the display engine 150 and displays 170 of the head-mounted display may be configured specifically to enable a fast frame display or refresh rate. In typical interactive graphics rendering systems, a target frame rate may be at or around sixty frames per second. While this is sufficient for the images to appear as crisp, smooth moving video in traditional systems, it may not be sufficient for artificial reality. Because of the immersive nature of the artificial reality experience, and further exacerbated by the head-mounted nature of the display and its proximity to the user's eyes, artificial reality rendering and display system 100 may target much higher frame display rates, e.g., upwards of two to three hundred frames per second, in order to display images responsive to changes in the user's viewpoint and/or movement (e.g., head and/or eye movement). If this is not done quickly enough, the resulting latency may cause a user to experience a sensory dissonance that can lead to virtual reality sickness or discomfort. In particular embodiments, the artificial reality rendering and display system 100 may be capable of tracking and reacting to the user's eye movements. To provide smooth video when reacting to eye movement, the system 100 may target even higher display rates during particularly intense periods, e.g., bursts of up to eight hundred frames per second.

The entire system may be configured with these fast display rate benchmarks in mind. A target frame rate of 200 frames per second is roughly equivalent to one frame every 5 milliseconds. Significant time is lost by transmitting movement data to, and updating rendering data from, a powerful graphics processor over wireless, or even wired connections. Therefore, at least some amount of graphics preparation must occur in a head-mounted unit, reducing the time lost in transmission. However, a head-mounted display unit 130 has weight, power, and space constraints that must be adhered to for the comfort of the user. These weight, power, and space constraints restrict the components and computational power available for a head-mounted display unit 130. In fact, using conventional approaches, components available for a head-mounted display unit 130 suitable for long-term wear are incapable of rendering artificial reality scenes from 3D models comprising polygons with suitable lighting at 60 frames per second, let alone the 200 or more necessary for an immersive experience.

To solve this problem, a powerful primary rendering component 120 may perform the complex graphics generation work needed to generate surfaces at around 60 frames per second. A display engine 150 of a head-mounted display unit 130 may comprise hardware components powerful enough to adjust or re-sampling what the primary rendering component 120 produces based on a user's movements between updates from the primary rendering component 120. The display engine 150 may rapidly respond to perspective changes created by a user's movement to reprocess the output of the primary rendering component 120, warping or otherwise adjusting the output of the primary rendering component 120 until the primary rendering component 120 has prepared another frame for display. For example, the primary rendering component 120, as described, may render 2D images of virtual objects in a 3D scene at typical rates, e.g., around sixty frames per second. The 2D images may be used to generate surfaces. Each surface may comprise location information that indicates the surface's 3D location relative to the viewer and texture information for the virtual objects they represent, including the results of complex lighting effects, occlusion determination, and implementation of other rendering techniques performed by the primary rendering component 120. The primary rendering component 120 may send the surfaces to the display engine 150. The display engine 150 may then use updated information about, e.g., the position and/or orientation of the user to re-sample the surfaces from the current user perspective and warp the surface to accommodate characteristics of the display. The simplified geometries of the scene (due to the use of surfaces), along with other optimization techniques, enable the display engine 150 to perform the task of refining and rendering the artificial scene at the desired target rates (e.g., at more than 200 frames per second). Thus, while the primary rendering component 120 prepares surfaces that are precise to a user's movements once every ¹⁄₆₀th of a second, the display engine 150 may re-sample the output to refine the position of graphic every ¹⁄₂₀₀th of a second, filling in the gaps created by the frame rate of the primary rendering component 120. This may create a high quality artificial reality experience for the user with smooth and seamless movement of computer generated graphics, while still providing comfortable equipment.

Figure 2:
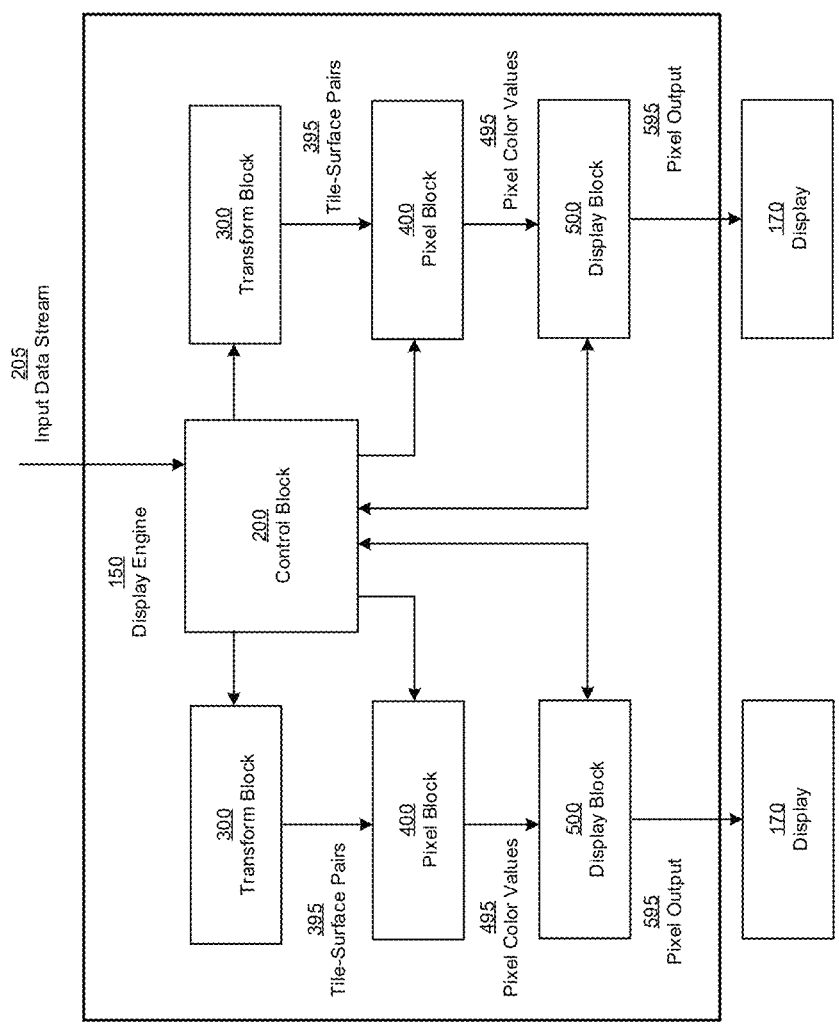
FIG. 2 illustrates an example high-level architecture for a display engine.

FIG. 2 illustrates a system diagram for a display engine 150. The display engine 150 may comprise four types of top level blocks. As shown in FIG. 2, these blocks may include a control block 200, transform blocks 300, pixel blocks 400, and display blocks 500. One or more of the components of the display engine 150 may be configured to communicate via one or more high-speed bus, shared memory, or any other suitable method. As shown in FIG. 2, the control block 200 of display engine 150 may be configured to communicate with the transform blocks 300, pixel blocks 400, and display blocks 500, of two mirrored pipelines. In particular embodiments, each pipeline of display engine 150 may be dedicated to preparing images for a separate display 170 to display. Each display 170 may be configured to display images to a user's left and right eye respectively. As explained in further detail herein, this communication may include data as well as control signals, interrupts and other instructions. The two pipelines may be capable of operating independently of the other.

In particular embodiments, the control block 200 may receive an input data stream 205 from the primary rendering component 120 and initialize a pipeline in the display engine 150 to finalize the rendering for display. In particular embodiments, the input data stream 205 may comprise data and control packets from the primary rendering component 120. The data and control packets may include information such as one or more surfaces comprising texture data and position data and additional rendering instructions. The control block 200 may distribute data as needed to one or more other blocks of the display engine 150. The control block 200 may initiate pipeline processing for one or more frames to be displayed. In particular embodiments, head-mounted display unit 130 may comprise multiple display engines 150 and each may comprise its own control block 200.

In particular embodiments, transform blocks 300 may determine initial visibility information for surfaces to be displayed in the artificial reality scene. In general, transform blocks 300 may cast rays from pixel locations on the display and produce filter commands (e.g., filtering based on bilinear or other types of interpolation techniques) to send to the pixel blocks 400. Transform blocks 300 may perform raycasting from the current viewpoint of the user (e.g., determined using inertial measurement units, eye trackers, and/or any suitable tracking/localization algorithms, such as simultaneous localization and mapping (SLAM)) into the artificial scene where surfaces are positioned and may produce results to send to the pixel block 400.

In general, transform blocks 300 may each comprise a four-stage pipeline, in accordance with particular embodiments. The stages of a transform block 300 may proceeds as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the displays 170 of the head-mounted display 130. Transform blocks 300 may determine whether each ray bundle intersects with surfaces in the scene by comparing a bounding box of each tile to bounding boxes for each surface. If a ray bundle does not intersect with a surface, it may be discarded. Tile-surface intersections are detected, and corresponding tile-surface pairs 395 are passed to the pixel blocks 400.

In general, pixel blocks 400 determine color values from the tile-surface pairs 395 to produce pixel color values, in accordance with particular embodiments. The color values for each pixel are sampled from the texture data of surfaces received and stored by the control block 200 (e.g., as part of input data stream 205). Pixel blocks 400 receive tile-surface pairs 395 from transform blocks 300 and schedule bilinear filtering. For each tile-surface pair 395, pixel blocks 400 may sample color information for the pixels within the tile using color values corresponding to where the projected tile intersects the surface. In particular embodiments, pixel blocks 400 may process the red, green, and blue color components separately for each pixel. Pixel blocks 400 may then output pixel color values 495 to the display blocks 500.

In general, display blocks 500 may receive pixel color values 495 from pixel blocks 400, convert the format of the data to be more suitable for the scanline output of the display, apply one or more brightness corrections to the pixel color values 495, and prepare the pixel color values 495 for output to the displays 170. Display blocks 500 may convert tile-order pixel color values 495 generated by pixel blocks 400 into scanline- or row-order data, which may be required by the displays 170. The brightness corrections may include any required brightness correction, gamma mapping, and dithering. Display blocks 500 may provide pixel output 595, such as the corrected pixel color values, directly to the displays 170 or may provide the pixel output 595 to a block external to the display engine 150 in a variety of formats. For example, the head-mounted display unit 130 may comprise additional hardware or software to further customize back-end color processing, to support a wider interface to the display, or to optimize display speed or fidelity.

Further details on the control block 200, transform blocks 300, pixel blocks 400, and display blocks 500 will now be described, starting with the control block 200. In particular embodiments, the control block 200 may receive an input data stream 205 from the primary rendering component 120 and initialize a pipeline in the display engine 150 to re-sample or correct artificial reality surfaces based on the user's current viewpoint. In particular embodiments, the control block 200 may receive control packets from the primary rendering component 120. The control packets may include one or more surfaces with texture data and position data (e.g., as defined by transformation matrices) to be rendered in the artificial reality scene.

Figure 3:
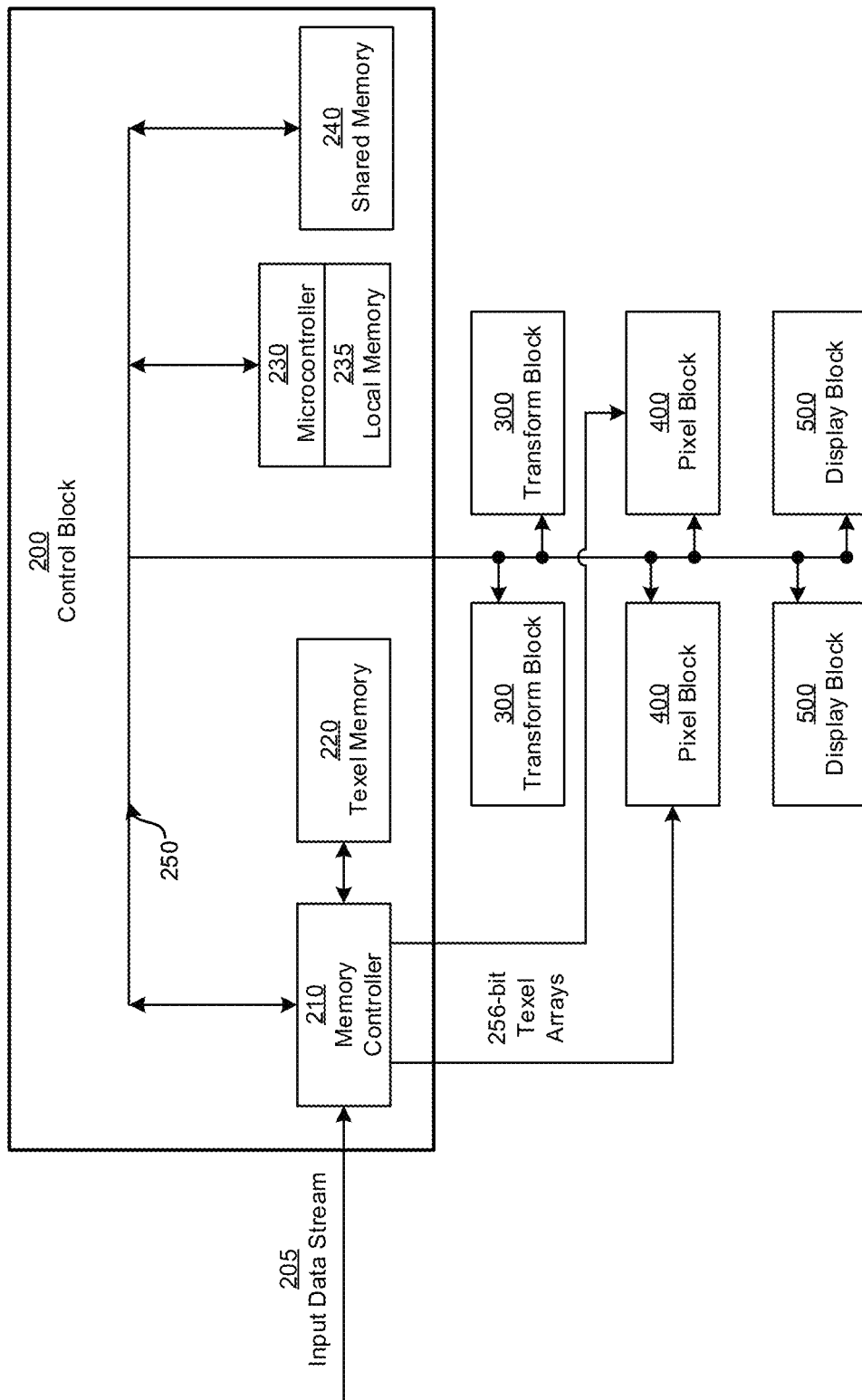
FIG. 3 illustrates an example control block.

FIG. 3 illustrates an architecture of an example control block 200, according to particular embodiments. In particular embodiments, the control block 200 may include a microcontroller 230 with local memory 235. The local memory 235 may act as a buffer for data received by the control block 200 from the primary rendering component 120. The control block 200 may include a shared memory 240 accessible by one or more other blocks of the display engine 150. The shared memory 240 may be used to store data used by the other blocks while preparing pixel color values for each frame. As an example, a transform block 300 may rely on precomputed values (e.g., values computed while transform block 300 is not active) as part of its pipeline operations. Similarly, a display block 500 may rely on values computed while the display block 500 is not active. These values may be stored in the shared memory 240. In particular embodiments, the microcontroller 230 may write to the shared memory 240 only while the other blocks are not active, such as after a frame has been processed and output to the display 170, or, where applicable, after data for a particular portion of a frame has been sent to the next block. This arrangement may prevent inconsistent results within the same frame. Similarly, status and performance updates may only be performed while the other blocks are not active, for example, during inter-frame time or after the microcontroller 230 has issued a command to stop the pipeline. In particular embodiments, the shared memory 240 may comprise sections that are set aside for use by a particular block. The microcontroller 230 may write to that section of the shared memory 240 only when a particular block of the display engine 150 is not active. Although this disclosure describes a microcontroller and shared memory in a particular manner, this disclosure contemplates any suitable manner microcontroller and shared memory.

The control block 200 may further include a texel memory 220 that stores texture data for use by the pixel blocks 400. The texel memory 220 may have a dedicated memory controller 210. In particular embodiments, texture arrays associated with surfaces may be directly written to the texel memory 220 via the memory controller 210. For example, both the microcontroller 230 and the memory controller 210 may be connected to the network fabric of the head-mounted display unit 130, which in turn may be communicatively coupled to the primary rendering component 120. As such, after the microcontroller 230 has set up the transfer with the sender of the texel array (e.g., the primary rendering component 120), the sender may write the texel array to the texel memory 220 via memory controller 210 through an input data stream 205. The microcontroller 230 may also control the input of texture data. In particular embodiments, the memory controller 210 may update the data stored in the texel memory 220 only during an inter-frame period or may update the data stored in the texel memory 220 only while the pixel block 400 is not active.

In particular embodiments, the texel memory 220 may be configured to respond to multiple read requests in parallel. The texel memory 220 and memory controller 210 may be configured to parse memory read requests from a pixel block 400 and read only a subset of the memory encompassing the requested data. As an example, data in the texel memory 220 may be stored in 256-bit wide logical banks, which are divided into 64-bit words. Upon receiving a memory read request, the memory controller 210 may determine which of those 64-bit words are needed and only retrieve those words, rather than retrieve the entire 256-bit logical bank. Performing reads in this fashion may reduce traffic on the bus used to send the read request and receive subsequent data. It may also reduce power usage by reducing the number of reads performed overall.

In particular embodiments, the memory controller may prioritize access to the texel memory 220 according to one or more priority schemes. For example, the memory controller 210 may treat writes to the memory (e.g., from the primary rendering component 120) with the highest priority. The memory controller 210 may treat read requests from a pixel block 400 with the next highest priority and may treat other access requests (e.g., requests over the high-speed communication bus 250) with the lowest priority. In particular embodiments, the texel data stored in the texel memory 220 may be stored according to a pattern particularly configured to reduce read time, subsequent processing time, power usage, and heat generation. In particular embodiments, the texel memory 220 and memory controller 210 may support multiple suitable color formats, with sizes varying based on the application at hand. For example, the color format may contain RGB, or RGBA specified colors, and may comprise any suitable size. Although this disclosure describes a texel memory in a particular manner, this disclosure contemplates any suitable texel memory.

In particular embodiments, communication throughout the control block 200 may be carried out on a high-speed bus 250 through which multiple components may communicate. The micro controller 230, the memory controller 210 and the shared memory 240 may connect to the high-speed bus 250. Components of transform blocks 300, pixel blocks 400 and display blocks 500 may also connect to the high-speed bus 250 to allow components of these blocks to communicate with the microcontroller 230 and shared memory 240. The high-speed bus may also connect to other components. In particular embodiments, the microcontroller 230 may have one or more dedicated busses to communicate with one or more components of the display engine 150.

In particular embodiments, the control block 200 may be configured to receive and process interrupts from the primary rendering component, one or more other components of the head-mounted display unit 130, one or more other components of the display engine 150, or any other suitable component of the artificial reality graphics rendering and display system 100. An interrupt may be issued to provide a high-priority command to a specific block of the display engine 150 or to the display engine 150 in general. As an example only and not by way of limitation, the microcontroller 210 of the control block 200 may be configured to receive a wakeup interrupt. The wakeup interrupt may cause the microcontroller 210 to initiate a boot sequence to be performed by each block of the display engine 150. As another example, the microcontroller 210 may be configured to receive an error interrupt from a block of the display engine 150. The error interrupt may indicate a fault encountered by the display engine 150. The microcontroller 210 of the control block may be configured to take remedial action (e.g., output debugging information to a log or display, entering a fail state route, or any other suitable remedial action) as needed. As another example, the microcontroller 210 may be configured to receive a stop interrupt. Upon receiving the stop interrupt, the microcontroller 210 may issue commands to cease execution of the rendering pipeline and enter a shutdown or pause routine. Although this disclosure describes particular interrupts and commands, this disclosure contemplates any suitable interrupts and commands.

Figure 4:
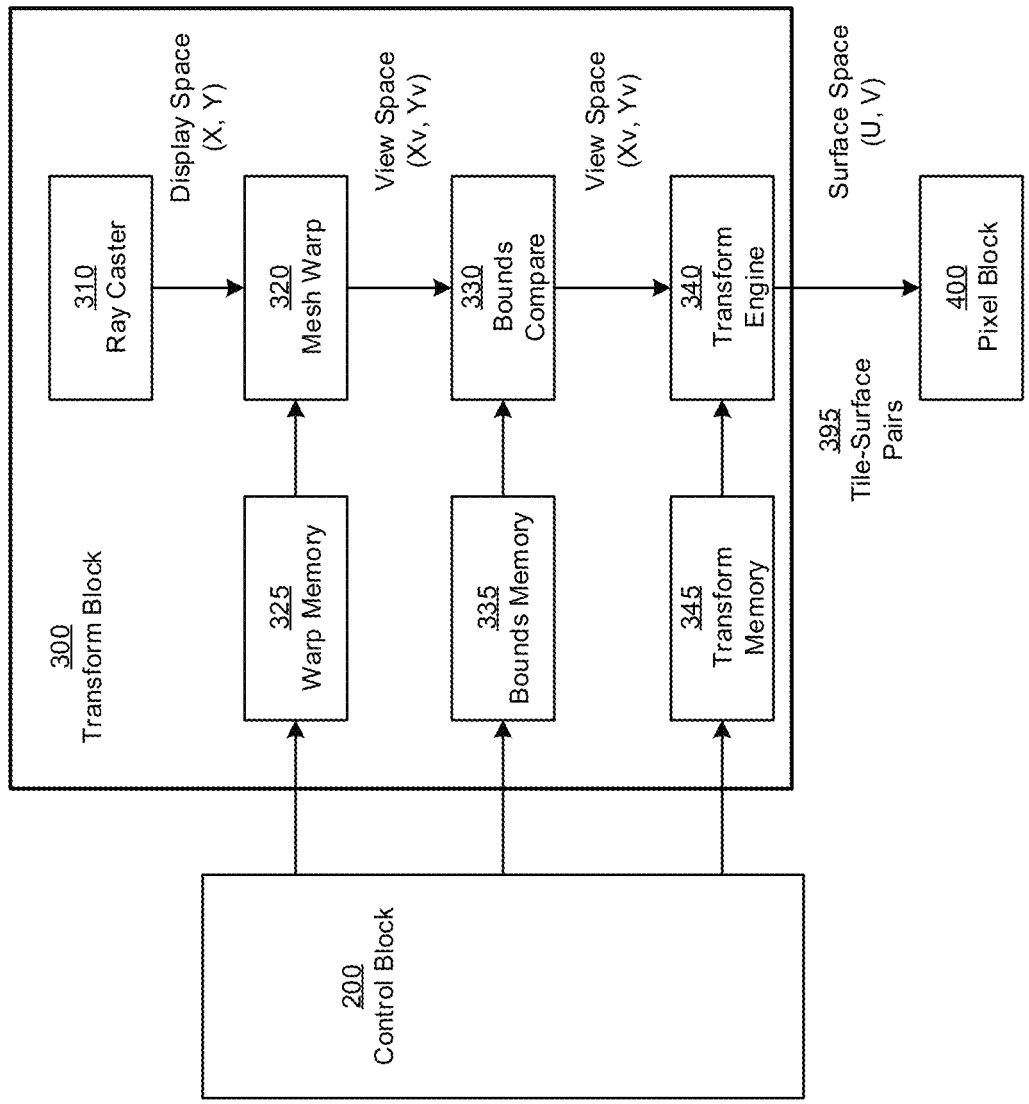
FIG. 4 illustrates an example transform block.

FIG. 4 illustrates the architecture of an example transform block 300. The transform block 300 includes a ray caster 310, a mesh warp block 320 and warp memory 325, a bounds compare block 330 and bounds memory 335, and a transform engine 340 and transform memory 345. In some embodiments, some or all of the warp memory 325, bounds memory 335, and transform memory 345, may be sections of the shared memory 240 of the control block 200 allocated for use by these memories. In some embodiments, each of the warp memory 325, bounds memory 335, and transform memory 345 may be a separate memory dedicated to storing the data used by their related blocks of the transform block 300. The data stored in these memories may be received by the microcontroller 230 of the control block 200, may be generated by the microcontroller 240 of the control block 200, or may be sourced in any other suitable manner, as will become evident by the description of the data therein below. In particular embodiments, a transform block 300 may include additional stages, and accompanying structures.

In particular embodiments, the transform block 300 may determine initial visibility information for surfaces to be displayed by a display. The transform block 300 may perform raycasting from the viewpoint of a user (e.g., as determined using motion sensor data, eye-tracking data, and/or tracking/localization algorithms) viewing an artificial reality scene. The results of the transform block 300 may be sent to the pixel block 400. In particular embodiments, display engine 150 may comprise a plurality of transform blocks 300. The blocks of a first transform block 300 may be able to advance independent of the state of blocks in a second transform block 300.

The transform block pipeline may comprise a ray caster 310 that performs ray casting into an artificial reality scene based on the position data associated with one or more surfaces. In general, raycasting is a technique for determining primary visibility of virtual objects in an artificial reality scene. A computing device sends rays originating from a viewpoint into a virtual scene with the goal of simulating the behavior of light particles in the scene. The color of the virtual object on which a ray lands is attributed to the color of the pixel to be displayed. Raycasting is, in this way, related to a technique known as raytracing with one distinction being that, while raytracing often involves following the ray through one or more reflections, raycasting does not. Instead, in raycasting, the computation associated with a "following" a ray ends after detecting that the ray has intersected a first virtual object.

Figure 7:
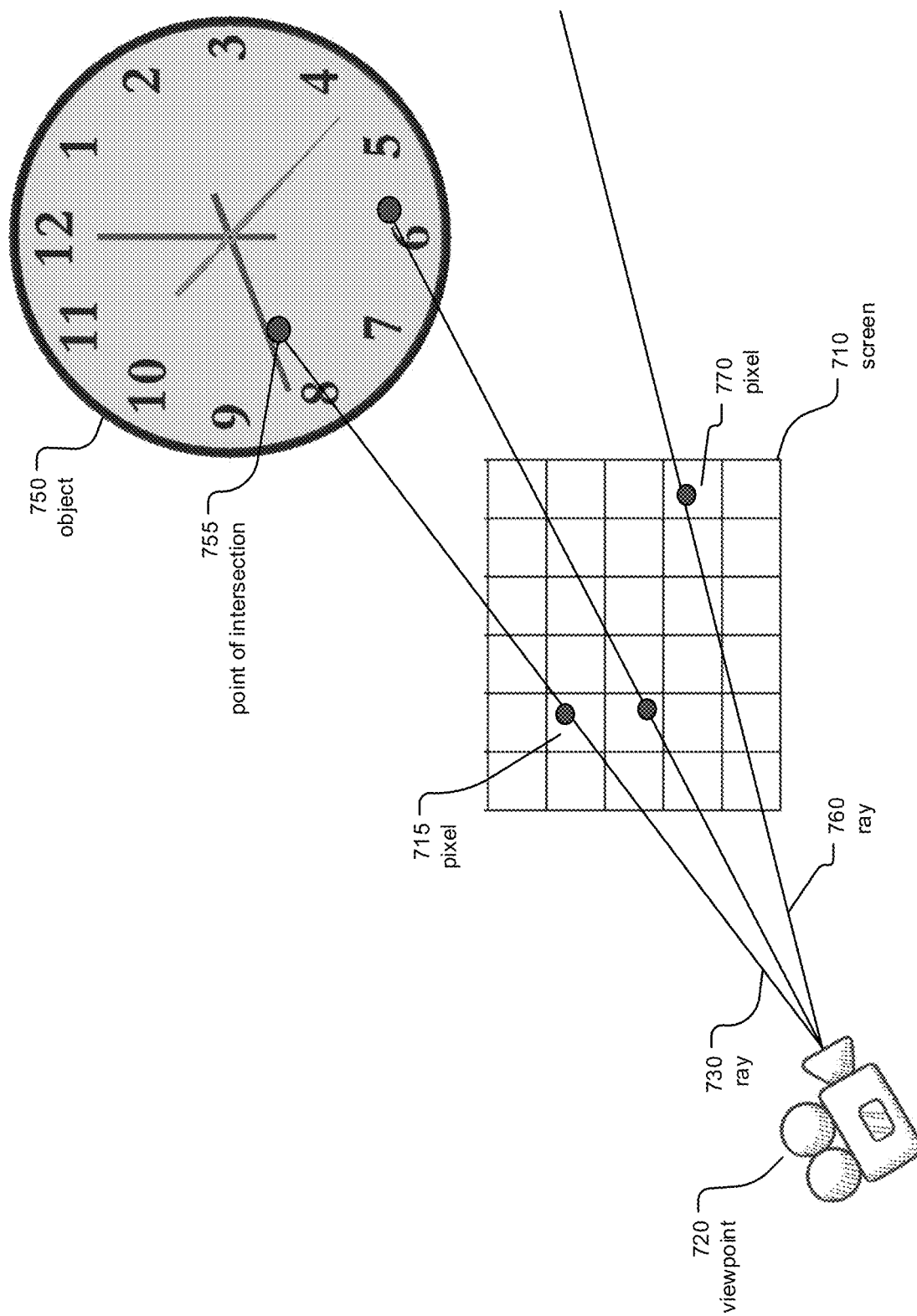
FIG. 7 illustrates an example raycasting configuration.

FIG. 7 illustrates a first raycasting process for determining visual information and location information of virtual objects (e.g., defined by 3D models composed of polygons) that are to be displayed within a view of a scene. A "view" of a scene may refer to a user perspective of the scene, which may, for example, be determined based on a current position and orientation of a head-mounted display unit 130. To better understand how an object is displayed within a view, it is helpful to imagine a number of imaginary rays emanating from a viewpoint (e.g., a "virtual camera" that may represent the viewpoint of a user viewing the scene) to pixels on a screen. As an example and not by way of limitation, referencing FIG. 7, the imaginary ray 730 may emanate from the viewpoint 720 and intersect with the pixel 715 of the screen 710. As another example and not by way of limitation, the imaginary ray 760 may intersect with the pixel 770. One or more imaginary rays may be cast repeatedly, using what may be referred to herein as a "ray-casting process," for all (or a subset) of the pixels of a screen to determine what each pixel should display (e.g., the color and transparency of the pixel). A computing system may perform a raycasting process and determine whether or not each of the imaginary rays intersects with a virtual object and may further determine where on the virtual object the imaginary ray intersects. As an example and not by way of limitation, the imaginary ray 730 may intersect with the object 750 (e.g., an AR clock) at the point of intersection 755. In this example, the computing system may determine that pixel 715 is associated with the point of intersection 755, because the ray 730 also intersects the screen 710 at the pixel 715. As another example and not by way of limitation, the imaginary ray 760 may not intersect with the object 750. In this example, the computing system may determine that pixel 715 should not be associated with the object 750. This use of the raycasting process may be referred to herein as a "visibility test," because it may be used to determine the object (or portions thereof) that are visible within a given view. The ray-casting process may ultimately be used to associate pixels of the screen with points of intersection on any objects that would be visible for a view of a scene.

Returning to the discussion of FIG. 4, the ray caster 310 of the transform block 300, may be responsible for preparing rays to be sent into the artificial reality scene. When used with the display engine 150, as described herein, the bulk of rendering tasks have been accomplished by the primary rendering component 120, including most object occlusion and shading details. The results of the rendering tasks performed by the primary rendering component 120 are captured in the position data and texture data of each surface. Then, the raycasting performed by the ray caster 310 (e.g., performing raycasting against a collection of surfaces) does not limit the fidelity that can be achieved by the display engine 150. In particular raycasting configurations, many rays may be used—for example, one ray corresponding to each pixel that will be displayed, or even sub-pixels. The path of rays is followed until they either contact a virtual object, or some threshold distance is exceeded. For example, the threshold may be based on the distance the ray has traveled, the amount of time spent on the calculation, or any other suitable metric. If the threshold is exceeded, it is determined that the ray has not struck a virtual object and a default value should be attributed to that ray. If the ray hit a virtual object, a value, often the color, of the virtual object is attributed to the ray. In some embodiments the color for the pixel corresponding to the ray is determined based on a value attributed to the ray.

As described above, to determine visibility, rays may be cast for each pixel in a display. This, however, may not be computationally efficient, since a scene with sparse surfaces may result in many rays not intersecting anything. Thus, in particular embodiments, the ray caster 310 may instead cast ray bundles or beams from a collection of pixels into the scene so that larger sampling footprints may be examined at once. Conceptually, if a ray bundle does not intersect any surface, then any ray within the bundle would not intersect any surface either. Based on this observation, once it is determined that a ray bundle does not intersect a surface, no further processing needs to be performed against that surface for the pixels from which the ray bundle is cast. If, on the other hand, the ray bundle intersects the surface, then the ray caster 310 may perform finer sampling for each pixel associated with the ray bundle. In particular embodiments, ray bundles may be cast from units of pixel collections. For example, a unit of aligned pixels from which a ray bundle is cast may be referred to herein as a "tile." For example, each tile may be an aligned block of 16×16 pixels of a display. The position of a tile may be specified based on any appropriate scheme, such as by specifying the four corners of the tile, a center point and distance to the edges, a mathematical equation, any other suitable method, or any combination thereof. In particular embodiments, the ray bundle that is cast from a tile may be defined by four rays that are cast from the four corners of the tile. Thus, a ray's position may be specified in the pixel coordinate space of a display (e.g., the (x, y) pixel position within the view space of the particular display, referred to as the "Display Space" in FIG. 4, such as a left-eye display 170 or a right-eye display 170, associated with the transform block 300).

In particular embodiments, the pixels of a display may be divided into rows of aligned tiles. The ray caster 310 may cast ray bundles for each of the tiles in a display. In particular embodiments, the ray caster may cast individual ray bundles for every tile within a horizontal row of tiles before moving on to the next row (alternatively, the sequence may be based on vertical columns of tiles if the scanline order is vertical).

In particular embodiments, the ray caster 310 may prioritize ray bundles. As an example, the ray caster 310 may prepare the ray bundles for tiles in an order based on the amount of expected time to process individual tiles. For example, images displayed by a scanning display may exhibit an effect known as chromatic aberration, wherein the red, green, and blue components of colors near the edges of the display are out of sync relative to the colors near the center of the display. This effect is described in more detail below. Due to efforts to correct this effect, processing tiles near the edge of the display may require more read bandwidth (e.g., for reading texel arrays from memory) and/or may take longer to process than tiles near the center of the display. For example, in embodiments where separate ray bundles are cast for each color component (e.g., red, green, or blue) to account for chromatic aberration, the intersection locations of each colored ray bundle may be different, which means that separate texture regions may need to be retrieved from memory (e.g., requiring three separate memory reads). For tiles that are closer to the center of a display, where chromatic aberration may be less pronounced, the same texture region may be used to compute the color for all three red, green, and blue ray bundles (e.g., requiring only one memory read). Based on this information, the ray caster 310 may alternate between preparing ray bundles for slower tiles (e.g., ones closer to the edges) with ray bundles for faster tiles (e.g., ones closer to the center). As an example, if there are 160 tiles in a row, then the following tile order would even out the average texel read bandwidth required: 0, 80, 1, 81, 2, 82 (each number corresponding to the order of a tile in the row of 160 tiles).

In the next block of the transform block 300, the mesh warp 320 may apply one or more "warp" or "distortion" meshes to the rays to specify their individual trajectories. Distortion meshes may be chosen to simulate, or correct, effects of a lens of a camera or a display, for example. While there are numerous advantages to a scanning display device, described above, there are also some disadvantages. Some of those disadvantages come in the form of distortions to the image when compared to the image on a conventional or ideal display. Using the metaphor of a camera peering into a scene through a lens, many of these distortions take the form of warping or geometric distortions caused by light being bent by the camera lens.

Figure 8:
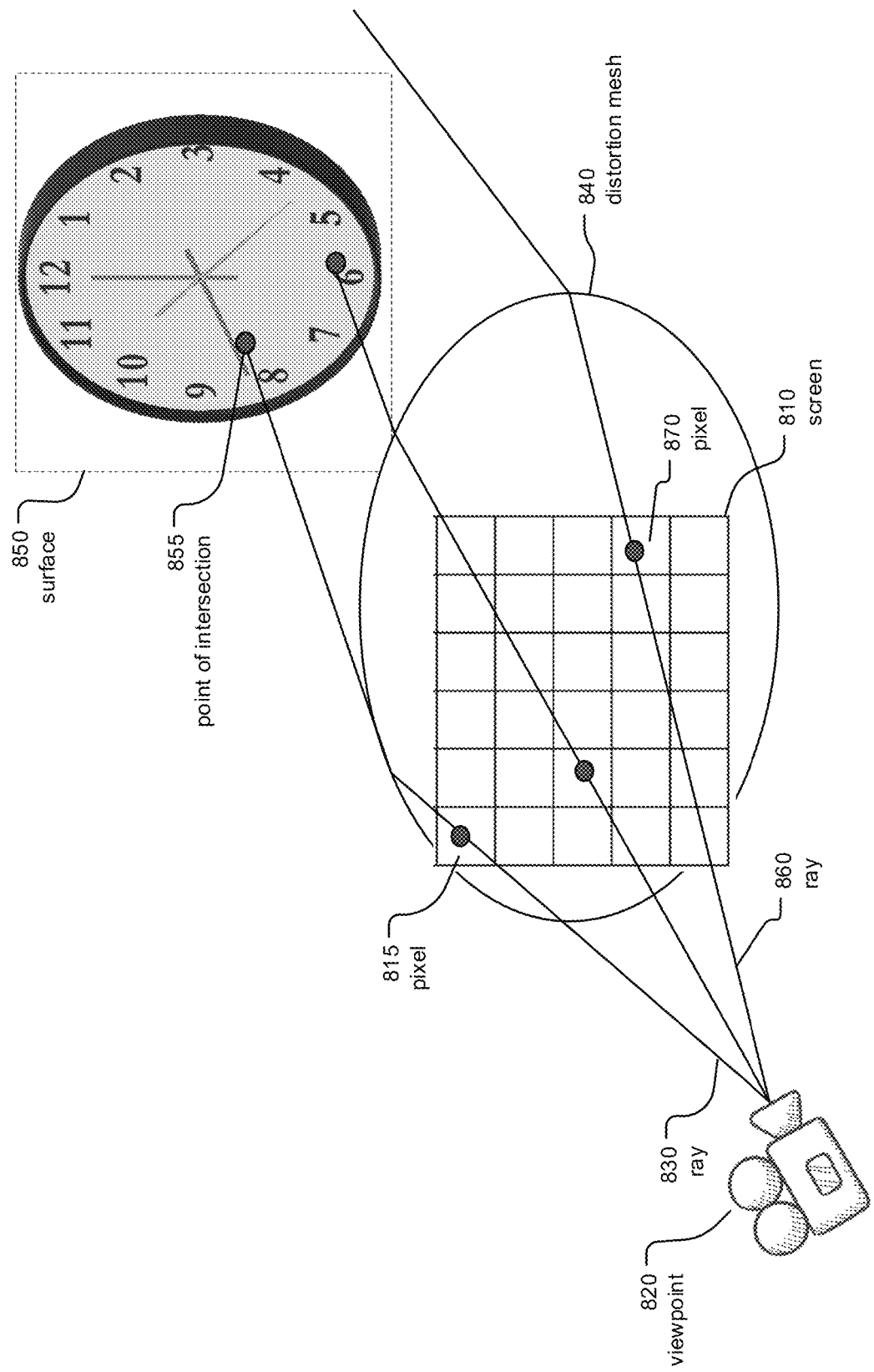
FIG. 8 illustrates an example raycasting configuration.

FIG. 8 illustrates an example conceptualization of a second raycasting process for post-warping or re-sampling a surface for display from a viewpoint of a scene. In particular embodiments, one or more surfaces may include location information that places them at specified locations within a 3D virtual space associated with the scene. As an example and not by way of limitation, referencing FIG. 8, the surface 850 may be placed at its illustrated location based on associated location information. In this example, although the surface may appear to depict a 3D clock with varying depths relative to the viewer (e.g., the 9 o'clock region may appear farther away from the viewer than the 3 o'clock region), the surface, in particular embodiments, may be a flat surface that is facing the viewer (e.g., its normal vector points towards the viewer, at least initially before the viewpoint changes). Any visual representations of an object(s) may be stored as part of the surface's texture data.

In particular embodiments, each texel of a surface may have associated location information that specifies where it is to be located. A raycasting process may be performed by the raycaster 310. As an example and not by way of limitation, referencing FIG. 8, the imaginary ray 830 may emanate from the viewpoint 820 and intersect with the pixel 815 of the screen 810 (e.g., the display 170 of one of two eyepieces of a head-mounted display unit 130). As another example and not by way of limitation, the imaginary ray 860 may intersect with the pixel 870. In particular embodiments, the mesh warp block 320 of the transform block 300 may account for distortion and/or other aberrations (e.g., chromatic aberrations) introduced by the optical structures of the head-mounted display unit 130 (e.g., optical effects of the lenses of a head-mounted display unit 130). The distortions/aberrations may be corrected for mathematically. This correction may be conceptually represented as a process whereby imaginary rays travel through a distortion mesh 840 that mathematically course-corrects the imaginary rays (e.g., the imaginary ray 830, the imaginary ray 860) to account for distortions/aberrations, as shown in FIG. 8. As an example and not by way of limitation, the imaginary ray 830 (following a course correction to account for distortion/aberration) may intersect with the surface 850 at the point of intersection 855. As another example and not by way of limitation, the imaginary ray 860 (following a course correction to account for distortion/aberration) may not intersect with the surface 850 or any other surface.

In particular embodiments, the mesh warp 320 of the transform block 300 may apply one or more distortion meshes to the rays to counteract, e.g. correct, these geometric distortions. One type of distortion is known as chromatic aberration. Chromatic aberration refers to an effect in optics where light exiting a lens becomes dispersed, causing a lens to focus light of different wavelengths (e.g., colors) at different focal points. A red component of a light ray may have a different angle of refraction from a green or blue component. The effect produces a blurry image with color fringes. The effect may occur when relatively inexpensive materials are used in lenses due to the physical properties of those lenses. Because the scanning element and optical systems of scanning display device may use less expensive and lighter weight materials, the scanning display may demonstrate this effect. Rather than use different hardware components, the effects of chromatic aberration can be corrected by the application of a distortion mesh. Since light rays of different colors behave differently, particular embodiments may cast rays separately for different colors (e.g., three rays for red, green, and blue may be cast from each pixel) and apply separately-defined distortion meshes to account for the different refraction characteristics of the different wavelengths. In particular embodiments, rather than defining separate distortion meshes for different colors, the distortion mesh for correcting chromatic aberration for the red and blue components may be specified as an offset from the green component.

The distortion mesh defined for addressing chromatic aberration may be configured to invert the expected chromatic aberration characteristics of the display 170 and/or the relative gazing direction of the user's eye (e.g., as determined by an eye tracker). When the distortion mesh is applied to rays sent into the artificial reality scene by the ray caster 310, the angles of the red, green, and blue rays may vary. In particular embodiments, the degree of variation between the red, green, and blue rays may itself vary based on the location of the ray in the display. The degree of variation near the center of a display may be nonexistent, while the degree of variation near one or more edges may be relatively large and easy to detect. The variation may change smoothly such that interpolation may be an efficient way to calculate all values for a distortion mesh. In some embodiments, the variation may be such that direct calibration may be required. The values may be precomputed as part of a one-time calibration event, stored in shared memory 240, or warp memory 325, and applied while the device is in use. However, lens and display properties may change with heat, the values of the distortion mesh may require adjustment if significant heat is detected.

Another type of distortion is known as a lens or scanning distortion. This distortion may be introduced because lenses are not perfectly uniform. As one scans their eye across surface behind a lens there may be slight variation in the angle of refraction of light from one location to the next. Often, the simulation of a lens, such as that used for ray casting, is assumed to be uniform. Failing to account for this distortion may cause odd behavior for light used in a scanning display, which may increase the effect of using relatively inexpensive materials as part of the scanning display. In particular embodiments, the rays from ray caster 310 may be distorted to invert the effects of lens distortion, creating the apparent effect of a perfectly uniform lens when viewed by the user. In some embodiments, this effect may be calibrated during manufacture, as it may be assumed that lenses will not vary significantly with use. In some embodiments, the lens may become damaged, may shift slightly in its mounting, plastic deformation may occur because of heat, or many other kinds of permanent modification may occur. The distortion mesh to correct lens distortion may be modified accordingly. Furthermore, the effect of lens distortion may be exacerbated during use due to effects like heat, which may warp the lens. The distortion mesh may require frequent recalibration to correct this effect.

Another type of distortion relates to how images are displayed on a scanning display device and is referred to as rolling shutter. Pixels of a scanning display device are not displayed all at once. Instead, they are "written" to the display following a scanning pattern. For example, all pixels of an entire row of the display may be written before moving down to the next row. To facilitate this, the display engine 150 may also determine the pixel color values for set rows of pixels before moving down to another row. While the display engine 150 is designed to provide a fast frame refresh rate, it is still possible that the artificial reality scene may change before the full frame can be output. This may generate an effect like the rolling shutter effect. A distortion mesh may be calculated to counteract this effect. The distortion mesh may be updated after each row of a frame is processed by the transform engine to prepare for the next incoming row.

Other distortions relate to how displays are manufactured. One distortion is referred to as die misalignment. Displays, including the emitter used in a scanning display, comprise aligned panels of LEDs. Due to difficulties in manufacturing dense LED panels, the panels are only aligned within a specified tolerance. The alignment of two panels of LEDs may be considered acceptable even if they are vertically misaligned within that tolerance that could exceed two pixels. This can cause each emitter display to comprise several misaligned panels. Therefore, the spacing and alignment of pixels may not be evenly or correctly distributed according to the ideal display, the model upon which artificial scenes are constructed. To correct for die misalignment, a distortion mesh may be generated to cause the appearance of pixels in the display to be uniform. As an example, the LEDs for each color channel (e.g., red, green, and blue) may not be aligned when composited into a single panel, or when the resulting image is combined for display. The misalignment may be such that two overlapping pixels may not be identified by a same coordinate number. For example, for the same pixel to be displayed, the LED in a red color panel may be referred to by the coordinate position (10, 10), while the LED at the same physical location in a blue color panel may be referred to by the coordinate position (11, 12). The distortion mesh as applied by the display engine may correct these alignment errors. As another example, a misalignment may result from the orientation of the LED panels. For example, a first LED panel may exhibit a rotation when compared to a second LED panel in the same composite panel (or composite image). This effect may be referred to as "clocking." The distortion mesh as applied by the display engine may correct for positioning errors resulting from the rotational misalignment. This approach may correct for significant hardware misalignment errors, greatly simplifying the requirements for manufacturing costs and tolerances. The distortion mesh, therefore, causes the angle of rays sent by the ray caster 310 to redirect enough to counteract the die misalignment effect, whatever the cause. In particular embodiments, this effect may be calibrated during manufacture, as it may be assumed that the misalignment will not vary significantly with use.

Another distortion relates to the position of LEDs in the display 170. To incorporate the required number of LEDs and to maximize quality, the odd- and even-numbered columns of LEDs may be positioned at slightly different positions along the vertical axis of the display. This distortion is referred to as "odd/even column distortion." Similar to die misalignment, this particular distortion may be corrected with a distortion mesh to counteract the effect. The distortion mesh may be generated during a calibration procedure, as the vertical alignment of the odd and even columns of LEDs is not likely to vary with use.

Distortions may also be introduced by adjusting the focal point of the simulated lens to correspond to a varifocal lens. In particular embodiments, the display 170 of the head-mounted display unit 170 may be mounted on a movable platform. This may allow the display 170 to adjust as the user's focal plane shifts, improving display fidelity and comfort for the user. However, moving the display may cause the effects corrected by previously computed distortion meshes to shift. Therefore, each time the display is moved, the distortion meshes may require adjustment. Similarly, the optic system in a scanning display may be altered to create the same effect, requiring a similar solution. Furthermore, a varying the focal plane may introduce its own distortions to occur, which may be corrected by a distortion mesh.

Another type of distortion may be introduced by the movement of the eye while viewing the display. The eye can move quickly, causing the user's view of the scene to shift. This may introduce distortions because rapid eye movement can cause images detected in the eye to shear. This effect differs from the rolling shutter effect at least in that eye movement-based distortions may be based on effects in the viewing eye itself, and not just in the display. As discussed above, the head-mounted display unit 130 may comprise an eye-tracking component comprising an eye-tracking camera and accompanying software. Eye tracking information may be passed to the control block 200 or the transform block 300. The eye tracking information may be used to predict eye movement, for example by detecting an acceleration of the eye, determine the degree of distortion that the user may experience. A distortion mesh may be calculated that counteracts the geometric distortion effects, of rapid eye movement.

To correct the geometric distortions described above, and any other geometric distortions, the mesh warp block 320 of the transform block 300 may apply one or more distortion meshes to the rays to define their trajectory into the artificial-reality scene. In particular embodiments, the distortion meshes are precomputed and stored in a warp memory 325 of the transform block 300. The distortions meshes are precomputed in the sense that the mesh warp block 320 does not generate the distortion meshes each time they are applied. Instead they may be generated by one or more other components based on a variety of inputs. Some distortion meshes may be static, in the sense that they may only need to be computed once or at least infrequently, such as during a calibration procedure. For example, to generate a distortion mesh to correct the die misalignment or odd/even column distortions, the exact degree of the distortion need only be determined once, as it is unlikely that the distortion will change significantly as the device is used. Other distortions can be corrected using a collection of meshes, precomputed and applied based on use. For example, distortion meshes to correct a lens or scanning distortion, or a distortion introduced by a rolling shutter can be calculated in advance, and the mesh warp block 320 or another suitable component of the transform block 300 may select the appropriate distortion mesh to use.

Other distortion meshes may be dynamic, in the sense that they may need to be updated frequently, up to and including each time a frame is rendered by the primary rendering component 120, once per frame rendered by the display engine 150, or perhaps even more frequently. For example, distortions introduced to correct lens movement of varifocal lenses may need to be updated whenever the varifocal lenses adjust. In particular embodiments, distortion meshes may be precomputed for particular lens configurations (e.g., one for the closest-possible position and another one for the farthest position). Based on the actual position of the lens (the data for which may be available from a lens-adjustment controller of the varifocal lens), the distortion value per pixel may be computed by interpolating the precomputed distortion values for that pixel as specified by the precomputed closest-position and farthest-position distortion meshes. The interpolated distortion values may then be used to distort the rays as they are being cast. Another example of a dynamic distortion mesh is used to correct distortions caused by eye movement. As the user's eyes move relative to displays (e.g., a left-eye display 170 and a right-eye display 170), the distortion mesh for each display may need to be updated each time eye movement or focus shift is detected. The adjustment to each distortion mesh may be computed based on the gaze of the user's eye relative to the display.

In particular embodiments, each of these distortion meshes may be calculated and stored in the warp memory 325. They may also be combined into a single distortion mesh and stored in warp memory 325. In particular embodiments, the distortion mesh may be composed of one or more lookup tables loaded by the microcontroller 230 of the control block 200 into the warp memory 325. The lookup table may include one or more entries that specify the degree of distortion for rays corresponding to individual pixels of a tile. For example, values of the lookup table may specify the degree of distortion for rays corresponding to the corner pixels of the tile. The warp block 320 may interpolate, from these corner values, distortion values to be applied to interior rays, or to the entire ray bundle. As another example, values of the lookup table may specify the degree of distortion for rays corresponding to all pixels in a tile. The warp block 320 may then apply the distortion values for the rays read from the warp memory 325. In particular embodiments, the lookup table may specify distortion values for ray bundles corresponding to a single color channel and may specify color offsets from that distortion value for ray bundles corresponding to other colors. For example, the lookup table may specify distortion values for a ray bundles for the green color channel. Offsets from the green distortion value may be specified for a red and blue color channel as well. Thus, the distortion mesh values may be retrieved once from the warp memory 325 and applied to three ray bundles. In some embodiments, the mesh warp block 320 may directly calculate the distortion mesh or meshes to be applied. Although this disclosure describes distortion meshes in a particular manner, this disclosure contemplates any suitable manner of distortion meshes.

In the bounds compare block 330 of transform block 300, the post-warp ray bundles are cast into the scene and it is determined whether the tiles corresponding to the ray bundles intersect with a surface in the scene. In particular embodiments, the surfaces, received by the control block 200 from the primary rendering component 120, may specify the dimensions and locations of the surfaces using a stated boundary or boundary function (e.g., minimum x and y coordinates in view space for one corner of the surface, maximum x and y coordinates in view space for the opposite corner). The boundary information for each surface may be precomputed by the controller block 200 and may be stored in a boundary memory 335 of the transform block 300. To determine whether a tile intersects with an surface, the ray bundle may traverse through the view space in which the surfaces are positioned. In particular embodiments, each ray bundle may be tested against each surface, one by one, to determine whether their respective boundaries intersect. In particular embodiments, the surfaces of the scene may be stored in a depth-wise manner, wherein surfaces closer to the viewpoint are set first in a data structure so that intersections with the closer surfaces may be tested first. As the ray bundle passes through the scene, the boundaries of each surface may be compared to the boundary of the projected ray bundle. Other efficiencies in performing this boundary comparison may be used. If a ray bundle is determined to have not intersected with any surface, the ray bundle may be discard and the corresponding tile may be associated with a default value or a flag indicating as much. The default value may be a specified background texture, a solid color, no color, any other suitable default value, or any combination thereof. If a tile is determined to have intersected with a surface, the tile-surface pair (e.g., an identifier for the tile and an identifier for the surface) are passed to the transform engine 340. The coordinates of the tile-surface pair and the intersection point may be specified in the view space coordinate system.

The transform engine 340 of the transform block 300 converts the coordinates of the tile in a tile-surface pair from a view coordinate space (e.g., 3D coordinate space relative to the viewer) to the texture coordinate space of the surface (e.g., 2D coordinate space within the texture). In the common understanding of coordinates in a rendering pipeline, the transform engine 340, using coordinate space information stored in in the transform memory 345, converts the coordinates of where the tile intersects the surface from the view space (e.g., (x,y) coordinates) into (u,v) coordinates of the surface's texture. For example, the transform engine 340 may convert the four corners of the tile into the surface coordinate space. In some embodiments, the transform engine 340 may directly compute the conversion. The data associated with the tile-surface pairs 395 are then passed to the respective pixel block 400. In passing the tile-surface pairs to the pixel block 400, the transform block 300 may also pass additional parameters, including the conversion values from (x,y) coordinates to (u,v) coordinates (including differential values), offset values in texture space for intersection locations of the ray bundles of other colors (e.g., if the absolute (u,v) coordinate specified is for the green component, additional information about the u and v offsets for red and/or the u and v offsets for blue, defined relative to green, may also be sent), an End of Row flag that indicates that all tiles for a row have been processed, any other suitable parameters, or any combination thereof. Although this disclosure describes coordinate conversion in a particular manner, this disclosure contemplates any suitable manner of coordinate conversion.

Figure 5:
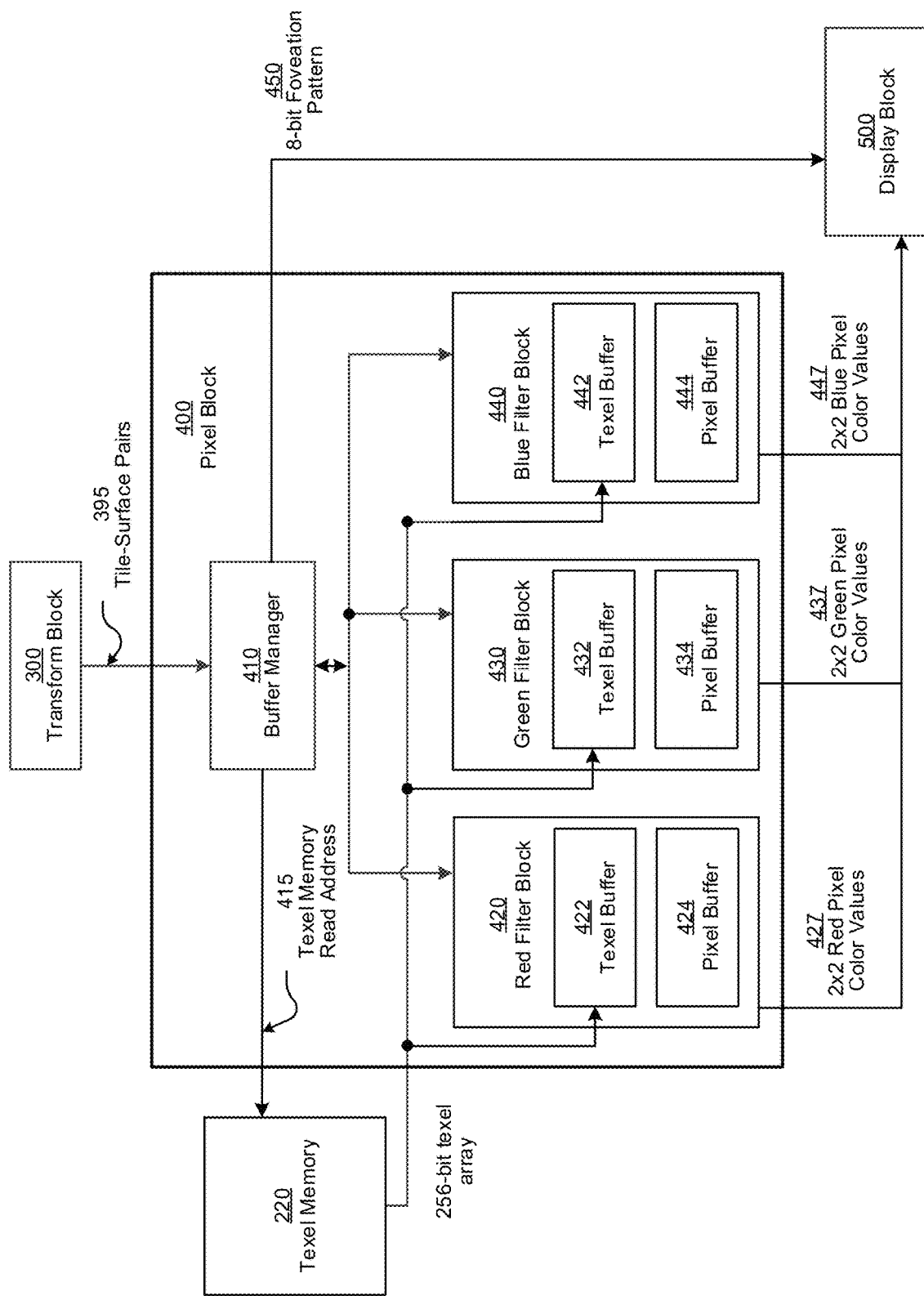
FIG. 5 illustrates an example pixel block.

A pixel block 400 may receive the tile-surface pairs 395 from the transform block 300 and perform bilinear interpolation at sample positions within each tile to determine the pixel color value for each pixel in the tile. The architecture of an example pixel block 400 are shown in FIG. 5. The pixel block 400 may include a buffer manager 410 that receives data and schedules the bilinear interpolation. The pixel block may further include a color filter block for each component of the color value, e.g., a red filter block 420, a green filter block 430, and a blue filter block 440. The three color components may be processed separately due to, at least, the possibility of chromatic aberration. In the example pixel block shown in FIG. 5, the buffer manager 410 may issue read requests 415 to the texel memory 220 by referencing particular memory addresses. The texel memory 220 may load corresponding data (e.g., in units of 256-bits per clock cycle, corresponding to 16 texels that are each 16-bit in size) into texel buffers 422, 432, 442, of the filter blocks 420, 430, 440, respectively. In particular embodiments, the filter blocks may optionally read from the texel memory 220, or other components of the pixel block 400 not shown in FIG. 5.

In the pixel block of FIG. 5, the buffer manager 410 may receive tile-surface pairs 395, which indicate the surface with which a tile intersects, from the transform block 300. Before scheduling samples for interpolation, the buffer manager 410 may load the relevant surface data (namely, the relevant portion and color channel of its texel array from the texel memory 220) into buffers within each of the red filter block 420, green filter block 430, and blue filter block 440. The buffer manager 410 may determine which texel array is relevant by computing, for each color component, a conservative bounding box in texture space that encompasses the intersection between the projected tile and the surface, as determined by the transform block 300. These bounding boxes are then used to determine which portion of the surface's texel array would be needed by any of the three filter blocks 420, 430, 440. The buffer manager 410 requests the needed portions of the surface's texel array from the texel memory 220 by referencing the appropriate memory address 415. The texel memory 220 loads the needed portions into the texel buffers 422, 432, 442 of the relevant filter blocks. In particular embodiments, the needed portions of data loaded into the texel buffers 422, 432, 442 would be sufficient to determine (e.g., via bilinear interpolation) the color for each sample location within the tile. For example, the appropriate color data associated with 32×32 texels would be loaded into the corresponding color filter block 420, 430, 440.

Depending on certain distortions, including chromatic aberration, the buffer manager 410 may need to make one or more separate requests from the texel memory 220 to satisfy the needs of the filter blocks 420, 430, 440. In a case with minimal chromatic aberration, a single read request from texel memory 220 (e.g., of a 256-bit word that corresponds to the 16-bit color information of 16 texels) may be used by all three filter blocks 420, 430, 440 (e.g., the read data may be loaded into their respective buffers in parallel). In cases with large chromatic aberration (e.g., more than 16 pixels), the buffer manager 410 may need to request separate sets of texel arrays for the filter blocks 420, 430, 440, depending on their needs (e.g., the buffer manager 410 may need to perform three separate read requests for the three filter blocks, respectively). Thus, chromatic aberration may cause up to a three times variance in the read bandwidth required from the texel memory 220. Because the ray caster 310 of the transform block 300 interleaves tiles with a predicted high chromatic aberration (e.g., along the edge of the screen) with tiles with a predicted low chromatic aberration (e.g., tiles near the center of the screen), this variation is controlled, and bandwidth needs of the texel memory 220 and pixel block 400 are evened out or load-balanced. This in turn reduces the memory bandwidth required to keep the pixel block 400 busy. Although this disclosure describes a buffer manager in a particular manner, this disclosure contemplates any suitable buffer manager.

In particular embodiments, for a given tile-surface pair, the buffer manager 410 may load the portions of the surface data necessary for each sample position in the tile before allowing filtering to begin. In particular embodiments, this may be done by loading all the required texels for a tile before processing the samples in that tile-surface pair. An example process for doing so may be as follows. Given the data associated with a tile-surface pair, the pixel block 400 may compute conservative bounding boxes for where the projected tile for each color component intersects the surface in texture space. Once space is available in all three texel buffers 422, 432, 442, the buffer manager 410 may issue a read request from texel memory 220 to obtain the texel data needed for determining the color values of sample locations within the tile (e.g., 16×16 samples). In particular embodiments, the needed data (e.g., 32×32 texels) within a bounding box may be obtained through sequential reads of sets of 4×4 texels. Each retrieved set of 4×4 texels may then be loaded into the texel buffer of each filter block that needs that particular set of 4×4 texels for color sampling.

Color sampling for each tile may be managed by a sample stepper block. Based on the tile-surface data 395 from the transform block 300, the sample stepper block can determine the (u,v) texture coordinates of where the corners of a projected tile for a particular color (e.g., green) intersects the surface. Within the footprint of the projected tile (as defined by the (u,v) coordinates of its corners), the sample stepper may determine multiple (e.g., 16×16) sample locations (specified in (u,v) texture space) within the tile by applying interpolation (e.g., incremental bilinear interpolation, so that the warped projected tile in texture coordinate space need not be a parallelogram) on the corner coordinates. The sample stepper may then walk through the 16×16 samples, issuing filter commands for 2×2 blocks of samples (which corresponds to 2×2 blocks of pixels in screen space). The quad of samples may be filtered in parallel. The filtering for each sample may be performed using bilinear interpolation or point sampling.

In particular embodiments, the red filter block 420 may perform bilinear interpolation with surface and tile data stored in its internal buffers. The texel arrays corresponding to the surface may be received from the texel memory and stored in one or more texel buffers 422. The texel buffers 422 may divide the texels in texel arrays by shifting the values of the associated (u,v) coordinates. The texel data may be stored in the texel memory 220 such that a read from the texel memory 220, when written to a texel buffer 422 causes the texel data to divide into aligned blocks of texels. The texel data is in turn stored in each texel buffer 422 to provide arbitrary blocks of aligned texels for interpolation. Four aligned pixel positions may be sampled in parallel by sampling from one or more pixel buffers 424. The pixel buffers 424 create a 2×2 block of sample positions from the tile in texture space (e.g., (u,v) coordinates). The texel buffer 422 and pixel buffer 424 are used to perform the bilinear interpolation. The bilinear interpolation may result in a 2×2 block of red pixel color values 427, which are provided as part of pixel output 595 to the display block 500.

In particular embodiments, additional strategies may be employed to optimize for speed or reduced power consumption over quality (e.g., using single point sampling in place of bilinear interpolation). Other optimizations for bilinear interpolation are also contemplated. For example, the buffer manager 410 may use sub-tiles (supplied by the transform block 300) to determine that a tile position does not intersect with a surface, and thus no bilinear interpolation is needed at that position. The red filter block 420 outputs the resulting pixel color values 427 to a designated memory position for the display block 500. The green filter block 430 and blue filter block 440 work in essentially the same manner by operating on texel values stored in respective texel buffers 432 and 442 for their respective color channels with the same pixel values stored in respective pixel buffers 434 and 444. The green filter block 430 may output green pixel color values 437 to the display block 500. The blue filter block 440 may output blue pixel color values 447 to the display block 500. The buffer manager 410 may support sharing of information (such as alpha color channel values) between filter blocks to reduce reads from the texel memory 220. Although this disclosure describes bilinear interpolation in a particular manner, this disclosure contemplates any suitable manner of bilinear interpolation.

In particular embodiments, an eye-tracker may report the user's focus, or fixation point, to the display engine 150 through the control block 200. The pixel block 400 may use this information to generate pixel color values corresponding to the user's focus point at a greater fidelity than pixel color values away from the user's focus point. This technique is known as foveated rendering. Foveated rendering allows the display engine 150 to prioritize pixel locations that a user is more likely to notice, saving rendering time, energy cost, and heat generation, among other factors, over rendering every pixel color value at the same degree of fidelity. The pixel block 400 may generate multiple kinds of foveation patterns based on the type of foveated rendering being performed. For example, one such pattern may be termed a foveated ring, in which there are distinct quality transition points at the pixel location moves further from the focus point. The pixel block may interpolate the quality level required between these rings. The pixel block may output the resulting pattern to the display block as an 8-bit foveation pattern 450 and may store the pattern in a foveation pattern memory 525. Although this disclosure describes foveated rendering in a particular manner, this disclosure contemplates foveated rendering in any suitable manner.

Figure 6:
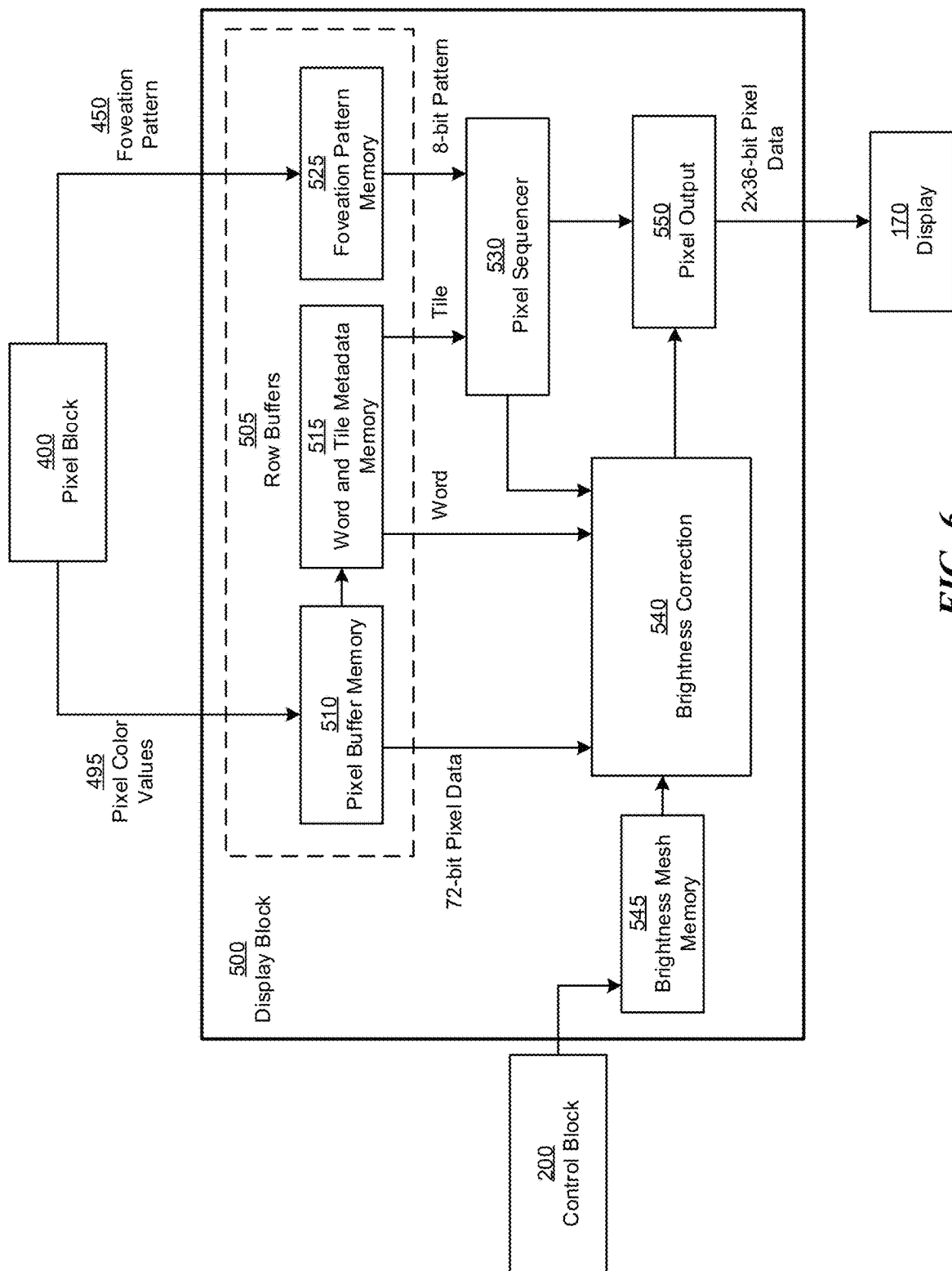
FIG. 6 illustrates an example display block.

In particular embodiments, the display block 500 may receive the pixel color values 495 from the pixel block 400 (e.g., accumulated in a tile buffer), apply one or more brightness corrections to the pixel color values 495, and prepare the pixel color values 495 for output to a display 170. When the pixel color values 495 are received by the display block 500, they may be received in tile-order, e.g., 2×2 blocks of aligned red, green, and blue color values. This is because the pixel block 400 may sequentially output pixel colors for 2×2 pixels in one tile (which may contain 16×16 pixels) before moving onto the next tile. In order to output the pixel color values 495 to be used by the display 170 (which may be a scanning display), the pixel color values 495 may be read out in scanline-order. The display block 500 may also apply one or more brightness corrections to the pixel color values 495 to further improve display quality. Architecture of an example display block 500 is shown in FIG. 6.

The first step in preparing pixel color values 495 for display is to store pixel color data 495 received from the pixel block 400 in a series of row buffers 500. The row buffers 500 include a pixel buffer memory 510, a word and tile metadata memory 515 and a foveation pattern memory 525. The pixel buffer memory 510 holds two rows of tiles for the entire width of the display 170. For example, in a configuration in which each tile is 16×16 pixels, and the display is 2560 pixels wide, the pixel buffer memory 510 would hold 32×2560 pixels. The configuration of the pixel buffer memory 510 may change depending on the particular scanline direction of the display 170, e.g., if the scanline direction is vertical and 1440 pixel tall, the pixel buffer memory may hold 1440×32 pixels. Each pixel in the pixel buffer memory 510 may be represented by 36-bit color values (e.g., 12-bit values for red, green, and blue color channels). In particular embodiments, the pixel buffer memory 510 may store the full color precision computed by the pixel block 400. In particular embodiments, the pixel buffer memory 510 may use compression such as a perceptual encoding to reduce the memory requirements of the pixel buffer memory 510. The row buffers 505 may comprise a word and tile metadata memory 515. The metadata memory 515 may store metadata received from the pixel block 400 in the pixel color values 495, or as a separate output. The metadata may indicate blocks of pixels that were not written by the pixel block 400, or tiles that do not include color values (e.g., because the ray bundle cast from the tiles did not intersect any surface), which may reduce wasted bandwidth and/or computation on pixels that do not need to be displayed because no pixel color values were generated. The row buffers 505 may also include a foveated pattern memory 525 that stores the 8-bit foveation pattern 450 generated by the pixel block 400 and associated with a tile in the pixel buffer memory 510.

In particular embodiments, the row buffers 505 may comprise a double-buffer configured to respectively store two rows of tiles (e.g., each tile representing 16×16 pixels), associated metadata, and foveation patterns. The pixel block 400 may write to one buffer while pixels in the other buffer are being output to the display 170. When output is complete (e.g., all pixels in the current output buffer has been output), the display block 500 may swap the role of the two buffers. For example, the buffer previously used for outputting pixels would now be written into, and the other buffer previously used for receiving new pixel data would be outputting those pixels to the display.

In particular embodiments, pixel color values 495 are received from the pixel block 400 (e.g., accumulated in a tile buffer) in 2×2 blocks of aligned pixels. The display block 500 consolidates aligned pairs of 2×2 blocks into a single 4×4 write into the pixel buffer memory 510. When there is a high throughput of 2×2 quads from the pixel block 400, they are typically in aligned pairs. This allows a single memory access port to be used for both reads and writes.

The memory in the pixel buffer memory 510 may be arranged so that data may be written in tile order and read out in row order. Pixel color data is read from the pixel buffer memory by in eight-by-one pixels into brightness correction block 540. The pixel buffer memory 510 may be organized into two banks: bank A and bank B. On even rows, bank A stores the first four pixels, followed by four pixels in bank B, and so on. On odd rows, the first four pixels are stored in bank B, followed by four pixels in bank A, and so on. The result is that each aligned 4×2 write and each aligned 8×1 read accesses 4×1 pixels from bank A and 4×1 pixels from bank B. This memory writing and reading pattern causes the pixel buffer memory 510 to convert tile-order writes into row-order reads. Although this disclosure describes converting pixel order in a particular manner, this disclosure contemplates converting pixel color order in any suitable manner.

The pixel sequencer 530 may read tile-validity data from the metadata memory 515. The pixel sequencer 530 may determine the order in which pixel color values are read from pixel buffer memory 510. In particular embodiments, the pixel sequencer 530 may cause 8×1 pixels to be read to the brightness correction block 540 for processing. The 8×1 pixels may be read two pixels per clock cycle (e.g., if each pixel has three 12-bit color-channel data, 72-bits would be read per clock cycle), which means that a total of four clock cycles may be used for 8×1 pixels to be read into the brightness correction block 540.

In particular embodiments, the pixel sequencer 530 may operate in a pixel-oriented mode. In this mode, all pixels are read from the pixel buffer memory 510 and are sent to the brightness correction block 540. In this pixel-oriented mode, the pixel sequencer 530 causes blocks of sixteen pixel color values to be read alternately from two different positions in the pixel buffer memory 510. Initially, the pixel sequencer 530 causes sixteen pixel color values to be read from the tile at the start of a row into the brightness correction block 540. Next it causes sixteen pixel color values from the tile that starts at the middle of the row to be read. It alternates from these two starting positions sequentially until the entire row has been read. The pixel-oriented mode may use this order to accommodate the pixel color value load pattern used by the display 170 for a scanning display device.

In particular embodiments, the pixel sequencer 530 may operate in a tile-oriented mode. In this mode, the pixel sequencer reads tile-validity metadata from the word and tile metadata memory 515 corresponding to the pixel color values read from the pixel buffer memory 510 and only causes pixel color values that correspond to tiles that have been marked valid according to the metadata to be read into the brightness correction block 540. In particular embodiments, the word and tile metadata memory 515 may designate particular memory addresses to store the tile-validity bits for the tiles within a row. For example, in a configuration in which each tile is 16×16 pixels, and the display is 2560 pixels wide, there would be 160 tiles in a row. As such, the metadata memory 515 may designate 160 bits to indicate whether their corresponding tiles are valid. The 160 tile-validity bits may be cleared (e.g., with binary value of "false" or "0") when the bits stored therein are read out. Each tile-validity bit may then be set as "valid" (e.g., the binary value of "true" or "1") when any pixel data is written into the pixel buffer memory 510 that corresponds to the tile associated with that tile-validity bit. For example, if a 2×2 pixel block is associated with the $10^{th}$ tile in the row of 160 tiles, the corresponding tile-validity bit would be set to "true" when that 2×2 pixel block is written into the pixel buffer memory 510. If no pixel data for a tile is loaded into the pixel buffer memory 510, the tile-validity bit for that tile would retain its "false" value.

In particular embodiments, the pixel sequencer 530 may process pixel data one row at a time. After a row of tiles (e.g., 160 tiles) has been loaded into the pixel buffer memory 510, the pixel sequencer 530 may read all metadata, such as tile-validity and foveation pattern data stored in the word and tile metadata memory 515 and the foveation pattern memory 525, respectively, in order from the start to the end of a row of tiles. These values are assembled and sent to the pixel output block 550, so that the downstream device (e.g., a display 170 and/or a field-programmable gate array) would know which tiles are valid or invalid and organize the incoming pixel values accordingly. For example, if the pixel output block 550 is configured to send 72-bits per clock (e.g., so that two-pixels worth of data could be sent per clock), the pixel sequencer 530 may assemble the metadata for eight tiles (e.g., with 9-bit metadata per tile, including 1 bit for tile validity and 8 bits foveation pattern) and instruct the pixel output block 550 to send the assembled data to the display 170 or other downstream devices. The pixel sequencer 530 may repeat the process until the metadata for all 160 tiles have been sent so that the downstream device knows which of the 160 tiles are valid and which are not. The pixel sequencer 530 then causes pixel color values (e.g., two pixels or 72-bits at a time) to be read from the pixel buffer memory 510 into the brightness correction block 540 (e.g., the pixel sequencer 530 may inform the brightness correction block 540 of which pixels to read from the pixel buffer memory 510). However, it only does this for pixel color values corresponding to tiles that have been marked valid. After being processed, the pixel data would be output to the downstream device. Since the downstream device knows which tiles are valid or invalid, it could organize the incoming pixel data accordingly. For example, if the tile-validity data indicates that the first tile (each representing 16×16 pixels) is invalid and the next tile in the same row is valid, the downstream device would know that the first set of 16 pixels it receives belong to the second tile (the valid tile) rather than the first (the invalid tile). Although this disclosure describes a pixel sequencer in a particular manner, this disclosure contemplates any suitable pixel sequencer.

The brightness correction block 540 applies one or more brightness corrections and display adjustments to the pixel color values before they are sent to the pixel output block 550. These display adjustments may include dithering, foveation, perception encoding, or one or more brightness correction meshes to correct for distortions. In particular embodiments, brightness correction meshes may comprise a scalar value for each pixel color value that is selected to create an optimal color value based on the entire frame, a subsection of the frame such as a row or aligned block of pixels (e.g., tiles), each individual pixel color value, or any combination thereof.

One type of brightness distortion is known as waveguide correction. In particular embodiments, the lenses used for the display 170, e.g., the lenses in the optics systems of a scanning display, may exhibit a smooth variance across the face(s) of the lens. This effect may also be found in the LED panels that may be used as an emitter for a scanning display. Therefore, as a user views different sections of the display, the variance of the lens may cause slight changes in brightness, even accounting for other distortions introduced by eye movement. This type of distortion can be measured and calibrated for in advance, as the smooth variance across the face of a lens is not likely to change with use. However, in particular displays, including a scanning display device, heat may introduce additional warping to the lenses, with significant heat causing plastic deformation. The brightness correction mesh to apply waveguide correction may be calculated in advance (e.g., during a calibration procedure) or may be calculated dynamically, as heat any other effects are detected.

Another type of brightness distortion is known as LED column correction. In particular embodiments, the brightness of each column of LEDs in the display, or the LEDs in the emitter of a scanning display, may vary slightly. In other words, brightness (at least as measured in this effect) is constant as you traverse vertically through a display but may vary from column-to-column as you traverse horizontally through the display. Typically, this variance may be difficult to detect because, though many LED panels may exhibit this effect, the LEDs are packed with a significant enough density and are viewed at a significant enough distance, that the eye naturally blends the brightness levels together. Because a head-mounted display is in extreme proximity to the user, this variance may be easier to detect. Therefore, each column of LEDs may require correction so that the image shown to the user masks the varying column brightness levels. One approach to corrections that may be taken is to scale each column to the maximum or minimum expressed value, that is, scale to the brightest or dimmest column. This correction can be determined during a calibration procedure, as, barring damage to the LED panels, the brightness variance is not likely to change significantly over time.

Another type of brightness distortion relates how LEDs emit light when supplied power and color instruction. Because the display engine is configured to enable high frame refresh rates, careful attention must be given to delays introduced by the pulse offset of the LED. The pulse offset of an LED refers to the amount of time from when an LED is powered and the point when the LED is at full brightness. A similar consideration is the amount of time it takes for the LED to go from full brightness to completely powered off. In some LEDs this follows a sinusoidal curve from off to full brightness, but other patterns are contemplated. In particular embodiments, to reduce difficulty in calibrating the brightness correction meshes, it may be assumed that each LED has an approximately similar pulse offset time. However, in some embodiments, the pulse offset may different based on, for example, the specific color to be displayed, manufacturing differences (even within tolerances), the position of the LED in the display, and many other factors. However, this brightness correction may likely be computed statically, as the effect may not change significantly with use.

Another brightness distortion that may arise relates to how information regarding pixel color values are represented, and specifically how the brightness values are stored. In particular embodiments, individual LEDs (or their drivers) may accept up to eight bits of color brightness information, allowing for a wide range of expressivity in color brightness. Because the display engine 150 is directed to fast and efficient processing of frames for display, in some embodiments, the pixel color values may fail to contain a full eight bits of color brightness information (e.g., up to 256 different brightness values). For example, the pixel color values produced may only include five bits of color brightness information (e.g., up to 32 different brightness values), an 87.5% reduction in possible brightness values. Therefore, a distortion mesh may be required to shift the brightness values into a more nuanced expression of possible values. This mesh may be precomputed but may vary based on the pixel color value representation format. As the display engine contemplates compatibility with a ride range of representations, multiple brightness correction meshes may need to be determined, even for pixels of the same frame or row.

Other effects that a brightness correction mesh may apply relate to additional image post-processing techniques. One such technique is dithering. Dithering involves the application of a randomized filter to a signal with the intention of smoothing out the values of the signal. In image processing, dithering may be used to smooth out brightness and color saturation values. Formally, dithering smooths out quantization of brightness colors caused by the attempt to represent color in a small amount of information. This prevents certain types of patterns from developing in the image, such as color or brightness banding. Dithering may also improve the smoothness of color distribution. Many dithering algorithms have been devised and can be embodied in a brightness correction mesh. The brightness correction mesh may be determined based on the frame (or part of the frame) being prepared for display. For example, different degrees of dithering may be required for frames with significant amounts of one color over another, or for frame with significant amounts of similar colors than one with many different colors.

Another post-processing correction is known as sRGB or perception compression. The human eye does not experience brightness in a linear matter, that is, the perceived variance in brightness between two brightness levels is not always equal to the actual variance in brightness. In particular, the human eye is better equipped to differentiate between dark colors than bright colors. Relatedly, to cause a desired perceived change in brightness, the human eye may need to be exposed to a different change in actual brightness depending on the initial brightness value. A color standard, termed sRGB specifies the transfer functions that map between equal perceptual steps and equal linear light steps. This encoding allows for the maximization of perceptually distinct intensities that may be stored in the same amount of information. The conversion between linear light values and sRGB values can be expressed with a discrete function, which may be encoded in a brightness correction mesh and applied to all pixel color values not already expressed in the sRGB compression. Although this disclosure describes brightness corrections in a particular manner, this disclosure contemplates brightness corrections in any suitable manner.

Another effect is known as foveated rendering. In foveated rendering, the display engine 150 may take advantage of the fact that the while the eye may be able to ascertain features in detail when they are the at or near the user's focus or fixation point, details are more difficult to ascertain as distance from the focus point decreases. As discussed above, an eye-tracker may report the user's focus point to the display engine 150 through the control block 200. In turn the pixel block 400 may use this information to render pixel color values corresponding to the user's focus point at a greater fidelity that pixel color values away from the user's focus point. The resulting pattern may be received by the display block 500 and may be stored as a foveation pattern in a foveation pattern memory 525. The foveation pattern may be passed to the display block by the pixel block 400 directly, may be passed through the shared memory 240 of control block 200, may be calculated by the microcontroller 230 or some other component, or may be generated in any other suitable manner. The display block 500 may use the foveation pattern to further control the degree of fidelity used for pixel color values as they are being prepared for display. Foveated rendering may be used to reduce the degree of brightness correction applied to pixel color values corresponding to pixel locations farther from the user's focus point. This may be specified on a continuous fashion, e.g., by interpolating the degree of quality between foveation rings, or on a threshold basis, e.g., if a pixel exceeds a certain distance, choose a particular degree of rendering quality.

The brightness correction block 540 may retrieve one or more brightness correction meshes from a brightness mesh memory 545. The brightness mesh memory may include one or more brightness correction meshes loaded by the microcontroller 210 of the control block 200. The brightness correction meshes may comprise a scalar brightness correction value stored for each corner pixel of a 16×16 tile. The brightness correction block 540 may interpolate the values for interior pixels using these corner values. In particular embodiments, the brightness correction mesh may specify a scalar brightness correction value for each pixel of a tile or the entire display. The brightness correction block 540 may determine the final intensity of pixel color values by multiplying the appropriate value from the brightness correction mesh with the pixel color values received from the pixel buffer memory 510. This process may be performed separately for each color channel of a pixel color value (e.g., once for the red color channel, once for the green color channel, and once for the blue color channel). For example, given a brightness correction mesh specifying brightness correction values, $B_r$, $B_g$, $B_b$, for the red, green, and blue color channels of a pixel, $P_r$, $P_g$, $P_b$, the final pixel color value for the red channel, $P_r'$ may be found by the equation $P_r'=P_r \times B_r$. The green and blue color channels may be found by a similar method. This disclosure contemplates any suitable method for determining final pixel color values given a brightness correction mesh and pixel color value.

After the brightness correction meshes are applied, the resulting pixel color values are sent to the pixel output block 550. The pixel output block 550 may send the pixel color values to the display 170, drivers for the display, or additional components as needed, according to a display mode. As an example, the pixel output block 550 may send pixel color values in a particular order to facilitate the operation of a scanning display device. In this mode, the pixel output block 550 may send pixel color values corresponding to the left edge of the display through the center of the display first, followed by pixel color values corresponding to the right edge of the display to the center, moving from top to bottom as each row is completed. Any other suitable display patterns are also contemplated. As another example, the pixel output block 550 may send pixel color values in a particular format to facilitate the operations of additional components. The pixel output block 550 may send a header with information describing the tiles corresponding to the pixel color values that follow. The pixel output block 550 may support a variety of pixel color value formatting options as the requirements of the display 170 or other components may dictate. The additional components may comprise a separate chip used to customize backend color processing or to support a wider interface to the display to optimize display speed or fidelity. Although this disclosure describes outputting pixels in a particular manner, this disclosure contemplates outputting pixels in any suitable manner.

Figure 9:
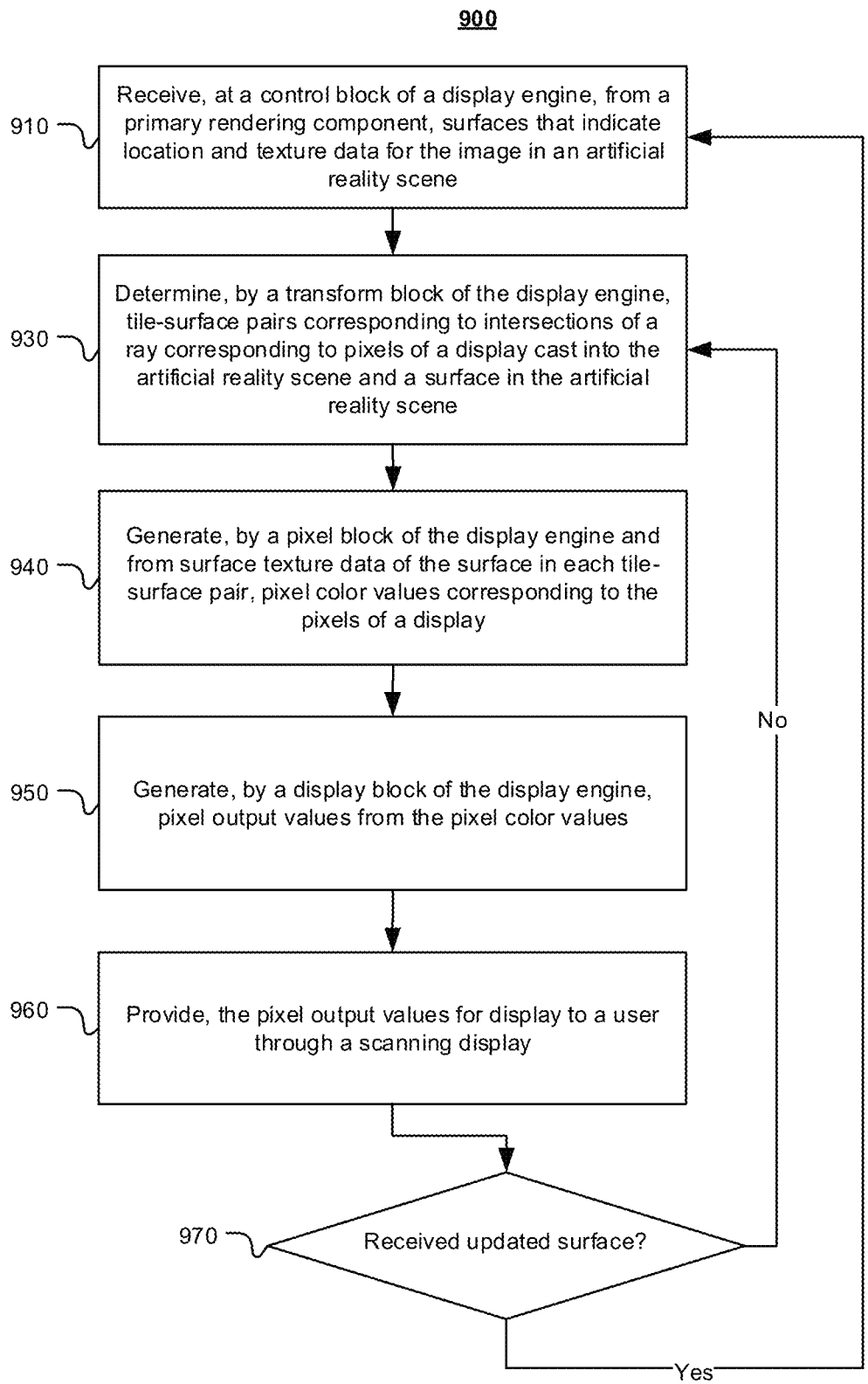
FIG. 9 illustrates an example method for generating graphics with a display engine of an artificial reality system.

FIG. 9 illustrates an example method 900 for generating graphics using a display engine 150 of an artificial reality system 100. The method may begin at step 910, where a control block 200 of a display engine 150 may receive one or more surfaces from a primary rendering component 120. The surfaces may be object primitives, generated from 2D images rendered using 3D models (e.g., using polygon-based rendering techniques) and from a particular viewpoint (e.g., the user's viewpoint at time to), that specify location data and texture data for the surface in an artificial reality scene. The control block 200 may load the surface texture data (e.g., one or more texel arrays) into a texel memory 220 via a memory controller. The control block 200 may receive other graphics-generation control data and store that data in a shared memory 240. The control block 200 may initiate graphics generation by the display engine 150. At step 930, a transform block 300 of the display engine 150 may determine tile-surface pairs corresponding to intersections of a ray (or ray bundle) corresponding to one or more pixels of a display 170 and a surface. The transform block 200 may perform raycasting using ray bundles generated for an array ("tile") of aligned pixels. The rays may be cast from an updated, current viewpoint of the user (e.g., at time ti after time to, mentioned above). The transform block 300 may determine visibility of surfaces by casting a ray bundles into the artificial reality scene and determining whether the ray bundle intersects with a surface. The transform block 300 may prepare tile-surface pairs for use by a pixel block 400. At step 940, a pixel block 400 of the display engine 150 may generate pixel color values for the pixels of a display 170 using surface texture data of the surfaces in the tile-surface pairs. The pixel block 400 may retrieve aligned texels of the tile arrays associated with the surfaces. The pixel block 400 may associate those texels with specific pixel values and perform bilinear interpolation on the texel color values to determine pixel color values. At step 950, a display block 500 of the display engine 150 may generate pixel output values for each pixel of a display 170. The display block 500 may re-order the pixel color values as needed by the display 170. At step 960, the display engine 150 may provide the output pixel values for display to a user through a display 170 (such as a scanning display). At step 970, the control block 200 of the display engine 150 may determine whether it has received updated surfaces from the primary rendering component 120. If no, the control block 200 may cause the display engine 150 to return to step 930 and repeat the graphics generation using the old surface data (e.g., associated with time to) but using the current user viewpoint. For example, the control block 200 may receive user viewpoint or position information necessitating a recalculation of tile-surface pairs, pixel color values, and pixel output. This process may repeat until a new surface is received (e.g., at time $t_n$, after several frames have been generated from the surface associated with time to). After a new surface is received, the control block 200 may cause the display engine 150 to return to step 910 and being the graphics generation process again using the updated surface data. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
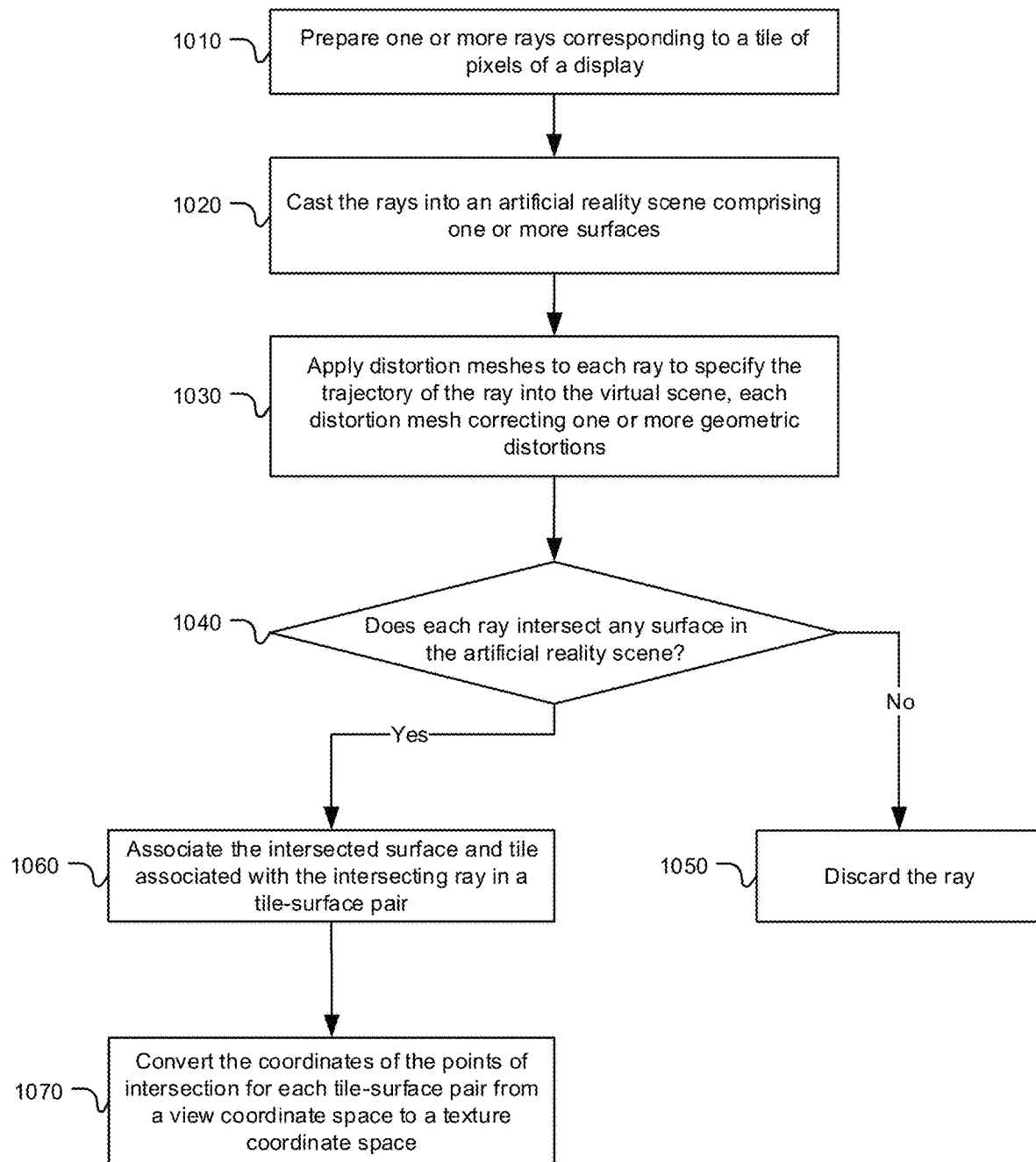
FIG. 10 illustrates an example method for determining surface visibility.

FIG. 10 illustrates an example method 1000 for determining visibility of surfaces in a virtual scene using a display engine 150. The method may begin at step 1010, where a raycaster 310 of a transform block 300 of the display engine 150 may prepare one or more rays corresponding to arrays ("tiles") of aligned pixels of a display 170. For example, the raycaster 310 may prepare ray bundles corresponding to one or more pixels of a tile or the four corners of a tile, or a single ray corresponding to the entire tile. At step 1020, the raycaster 310 may cast the rays into an artificial reality scene that includes one or more surfaces. The raycaster 310 may caster rays through a screen corresponding to a display 170 starting at the view point of a user. At step 1030, a warp block 320 of the transform block 300 may apply one or more distortion meshes to each cast ray to specify the trajectory of the individual ray into the virtual scene. The distortion meshes may be configured to correct for one or more geometric distortions that may occur as a result of the manufacturing or design of the display 170. The distortion meshes may include lookup tables, stored in a warp memory 325 or a shared memory 240, that indicate the degree of distortion the ray should experience. The distortion meshes may specify the degree of distortion for the corner rays of a ray bundle. The distortion meshes may specify the degree of distortion for rays associated with a particular color channel and an offset for other color channels. At step 1040, a bounds compare block 330 of the transform block 300 may determine whether each cast ray bundle intersects a surface in the artificial reality scene. The bounds compare block 330 may compare a bounding box for the tile represented by the ray bundle to a bounding box for the surface. If the ray bundle does not intersect with a surface (e.g., their bounding boxes do not intersect), at step 1050 the transform block 300 may discard the tile associated with the ray bundle (e.g., does not process the pixel values for the discarded tile). If the ray bundle does intersect with a surface, at step 1060 the bounds compare block 330 may associate the intersected surface with the tile represented by the ray bundle. The bounds compare block 330 may determine the location of the intersection. At step 1070 a transform engine 340 of the transform block 300 may convert the location of the intersection from a view space coordinate system to the coordinate system of the texture of the surface of the tile-surface pair. Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for determining visibility of surfaces in a virtual scene including the particular steps of the method of FIG. 10, this disclosure contemplates any suitable method for determining visibility of surfaces in a virtual scene including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Figure 11:
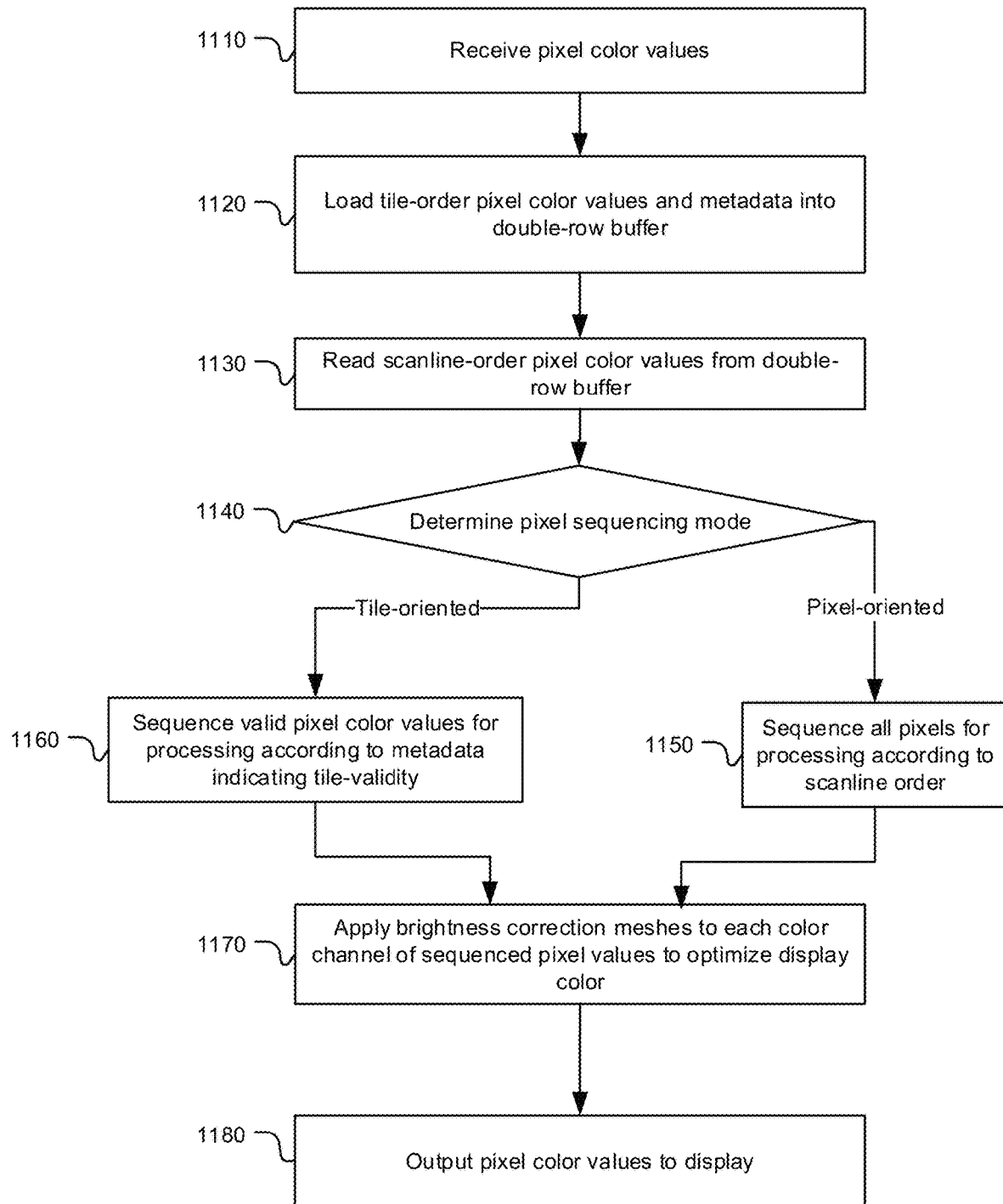
FIG. 11 illustrates an example method for preparing pixel color values for output.

FIG. 11 illustrates an example method 1100 for preparing pixel color values for output by a display engine 150. The method may begin at step 1110, where a display block 500 of the display engine 150 may receive pixel color values. For example, the display block 500 may receive the pixel color values from a pixel block 400 of the display engine 150. At step 1120, the display block 500 may load the pixel color values into one or more row buffer 505. In particular embodiments, the display block 500 may load the pixel color values into a double-row pixel buffer memory 510. The display block 500 may write additional data associated with the pixel color values into related double-row buffers, such as a word and tile metadata memory 515 and a foveation pattern memory 525. As the values are loaded into the row buffer 505, they may be tile ordered (e.g., the values still reflect a 16×16 alignment of pixels). At step 1130, pixel color values (and, optionally, other associated data) may be read from the row buffer 505 in a scanline-oriented order. The display 170 may be a scanning display that requires pixel color values to be presented in a particular pattern (e.g., pixel row by pixel row), rather than all together as a single frame. The pixel color values may be read in a manner than reflects this pattern (e.g., reading all pixel color values on a row before advancing to the next). At step 1140, the pixel sequencer 530 may determine which pixel sequencing mode is being used. The pixel sequencing mode may determine additional details about how pixel color values should be presented to the display 170. If the pixel sequencing mode is a pixel-oriented mode, at step 1150, the pixel sequencer 530 may cause values for all pixels of a display, regardless of whether there is a valid associated pixel color value, to be read into a brightness correction block 540. If the pixel sequencing mode is a tile-oriented mode, at step 1160, the pixel sequencer may read the tile metadata from the tile metadata memory 515 and determine whether each tile loaded into the row buffer 505 included valid pixel color values. If a given tile lacks valid pixel color values, the pixel sequencer 530 may bypass pixels of that tile when reading the pixels form the pixel memory 510.

At step 1170 the pixel sequencer 530 may cause the pixel color values for pixels to be output by the display block 500 (e.g., pixels associated with valid tiles) to be read into a brightness correction block 540 of the display block 500. The brightness correction block 540 may apply one or more brightness correction meshes to the pixel color values. The brightness correction meshes may be arrays or lookup tables, stored in a brightness mesh memory 545, that include a scalar value for one or more pixels of a tile (or the display) chosen adjust that pixel to an optimal brightness. For example, a brightness correction mesh may specify the brightness correction values for the corner pixels of a tile. The brightness correction block 540 may then interpolate the brightness correction values to be applied to the interior pixels of a tile, as they are read into the brightness correction block 540. The brightness correction meshes may specify values on a color-channel basis (e.g., one value for the red channel of a pixel color value, one value for the green channel, and one value for the blue channel). The brightness correction block 540 may apply the brightness correction value for each channel. To apply the brightness correction value for a pixel, the brightness correction block 540 may multiply the pixel color value with the brightness correction values. The resulting pixel color is the pixel output value. The brightness correction block 540 may send the pixel output values to the pixel output block 550. At step 1180, the pixel output block 550 may finalize the pixel output values and provide the pixel color values to the display 170. Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for preparing pixel color values for output including the particular steps of the method of FIG. 11, this disclosure contemplates any suitable method for preparing pixel color values for output including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Figure 12:
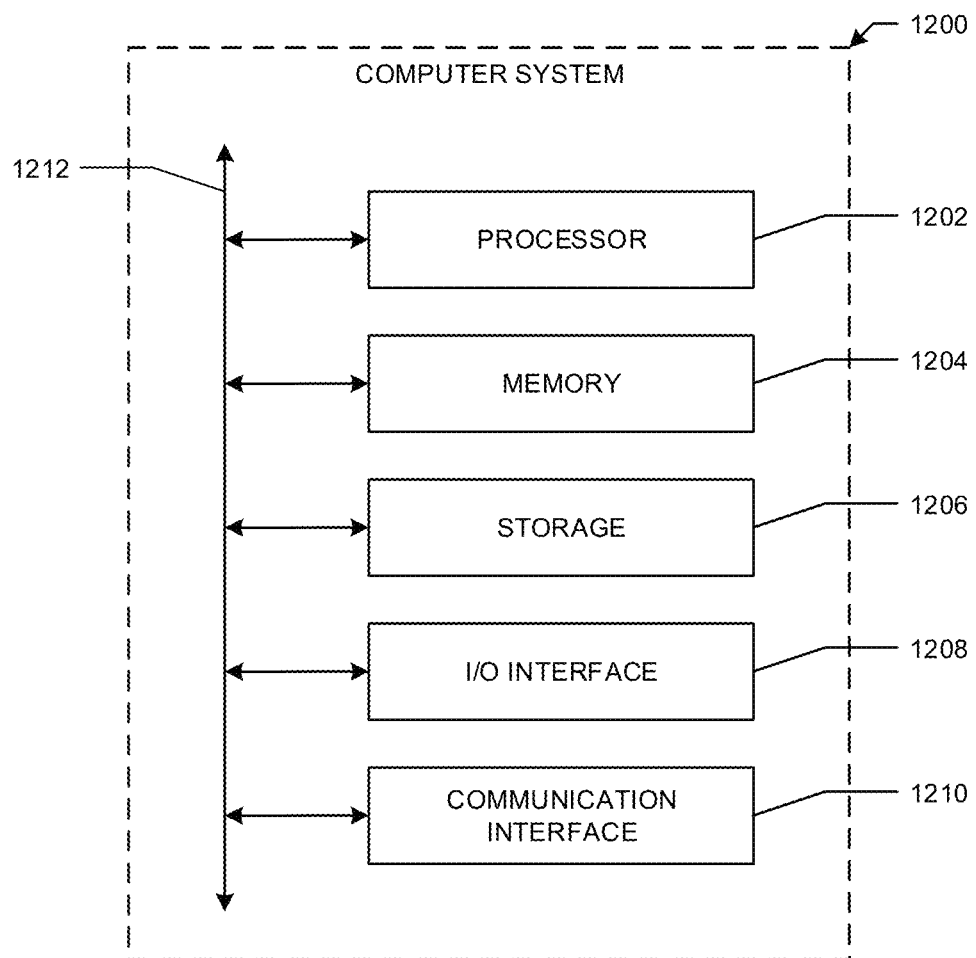
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system

1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
generating a plurality of ray bundles for casting into an artificial reality scene, wherein each ray bundle of the plurality of ray bundles comprises two or more rays, wherein an origin and a trajectory of each ray bundle are based on a viewpoint;
applying a geometric transformation to one or more of the ray bundles that modifies the trajectory of each ray bundle from the origin into the artificial reality scene, wherein the geometric transformation is based on one or more distortion characteristics of a display system;
determining, based on the origin and modified trajectories of the ray bundles, points of intersection of one or more of the ray bundles with one or more surfaces in the artificial reality scene by comparing one or more corners of each ray bundle to the one or more surfaces;
generating an image of the artificial reality scene as viewed from the viewpoint using color values generated based on the determined points of intersection; and
providing the image for display by the display system.

2. The method of claim 1, wherein the viewpoint is determined by:

an inertial measurement unit coupled to the display system;
an eye tracking system coupled to the display system; or
a simultaneous localization and mapping system coupled to the display system.

3. The method of claim 1, wherein each ray bundle comprises rays grouped based on a respective origin of each ray.

4. The method of claim 3, wherein determining points of intersection of one or more of the ray bundles with the one or more surfaces in the artificial reality scene further comprises:
determining a bounding box for the one or more of the ray bundles; and
comparing the bounding box to respective bounding boxes for the one or more surfaces of the artificial reality scene.

5. The method of claim 1, wherein the surfaces of the artificial reality scene are associated with surface texture data; the method further comprising:
mapping coordinates for the points of intersection to surface coordinates of a surface texture of intersected surfaces; and
accessing color values from surface texture data of the intersected surfaces at the surface coordinates.

6. The method of claim 1, wherein the origin of each ray bundle corresponds to an output position of the display system; and
wherein determining, based on the origin and modified trajectories of the ray bundles, the points of intersection of the one or more of the ray bundles with the one or more surfaces in the artificial reality scene further comprises:
determining a prioritization order for evaluating whether the ray bundles intersect with the one or more surfaces, wherein the prioritization order is based on at least a distance of the output position corresponding to the origin of the ray bundles from an edge of the display system; and
evaluating the modified trajectories of the ray bundles for intersections according to the prioritization order.

7. The method of claim 1, wherein the geometric transformation is further based on a focus point of the viewpoint.

8. The method of claim 1, wherein the geometric transformation is further based on a focal plane distance of a viewer of the artificial reality scene.

9. The method of claim 1, wherein the geometric transformation is further based on a color channel associated with the ray bundles.

10. The method of claim 1, wherein the one or more distortion characteristics of the display system comprise a warping of the artificial reality scene caused by a lens component of the display system.

11. The method of claim 1, wherein the one or more distortion characteristics of the display system comprise non-uniform distortions in a lens component of the display system.

12. The method of claim 1, wherein the one or more distortion characteristics of the display system comprise a scanline display rate of the display system.

13. The method of claim 1, wherein the one or more distortion characteristics of the display system comprise a misalignment of light emitting components of the display system.

14. The method of claim 1, wherein applying the geometric transformation to one or more of the ray bundles that modifies the trajectory of each ray bundle from the origin into the artificial reality scene comprises:

accessing geometric correction data specifying geometric transformations for a first set of the ray bundles; and interpolating values for the specified geometric transformations to determine geometric transformations for a second set of the ray bundles.

15. The method of claim 1, further comprising:

determining non-intersecting ray bundles not associated with a point of intersection with the one or more surfaces in the artificial reality scene;

associating a default color value with the non-intersecting ray bundles; and providing, for display by the display system, the default color value.

16. One or more computer-readable non-transitory storage media embodying software that is operable when executed to:

generate a plurality of ray bundles for casting into an artificial reality scene wherein each ray bundle of the plurality of ray bundles comprises two or more rays, wherein an origin and a trajectory of each ray bundle are based on a viewpoint;

apply a geometric transformation to one or more of the ray bundles that modifies the trajectory of each ray bundle from the origin into the artificial reality scene, wherein the geometric transformation is based on one or more distortion characteristics of a display system;

determine, based on the origin and modified trajectories of the ray bundles, points of intersection of one or more of the ray bundles with one or more surfaces in the artificial reality scene by comparing one or more corners of each ray bundle to the one or more surfaces;

generate an image of the artificial reality scene as viewed from the viewpoint using color values generated based on the determined points of intersection; and provide the image for display by the display system.

17. The media of claim 16, wherein the viewpoint is determined by:

an inertial measurement unit coupled to the display system;

an eye tracking system coupled to the display system; or a simultaneous localization and mapping system coupled to the display system.

18. The media of claim 16, wherein each ray bundle comprises rays grouped based on a respective origin of each ray.

19. A system comprising:

one or more processors; and one or more computer-readable non-transitory storage media coupled to one or more of the processors and comprising instructions operable when executed by one or more of the processors to cause the system to:

generate a plurality of ray bundles for casting into an artificial reality scene, wherein each ray bundle of the plurality of ray bundles comprises two or more rays, wherein an origin and a trajectory of each ray bundle are based on a viewpoint;

apply a geometric transformation to one or more of the ray bundles that modifies the trajectory of each ray bundle from the origin into the artificial reality scene, wherein the geometric transformation is based on one or more distortion characteristics of a display system;

determine, based on the origin and modified trajectories of the ray bundles, points of intersection of one or more of the ray bundles with one or more surfaces in the artificial reality scene by comparing one or more corners of each ray bundle to the one or more surfaces;

generate an image of the artificial reality scene as viewed from the viewpoint using color values generated based on the determined points of intersection; and provide the image for display by the display system.

20. The method of claim 1, further comprising, after determining points of intersection of the one or more of the ray bundles with the one or more surfaces in the artificial reality scene:

determining a point of intersection of one or more of the two or more rays of each ray bundle with the one or more surfaces; and determining a color value corresponding to the one or more of the two or more rays based on the point of intersection for each of the one or more of the two or more rays.

* * * * *